US011750237B2

(12) United States Patent
Kim et al.

(10) Patent No.: US 11,750,237 B2
(45) Date of Patent: Sep. 5, 2023

(54) CASE OF FLEXIBLE DISPLAY DEVICE

(71) Applicant: LG ELECTRONICS INC., Seoul (KR)

(72) Inventors: Jaewook Kim, Seoul (KR); Woojin Lee, Seoul (KR); Taeki Um, Seoul (KR); Insu Song, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/990,287

(22) Filed: Aug. 11, 2020

(65) Prior Publication Data

US 2021/0320680 A1    Oct. 14, 2021

(30) Foreign Application Priority Data

Apr. 13, 2020    (WO) ................ PCT/KR2020/004953

(51) Int. Cl.
| *H04B 1/3888* | (2015.01) |
| *H04M 1/04* | (2006.01) |
| *H04M 1/02* | (2006.01) |

(52) U.S. Cl.
CPC ........ *H04B 1/3888* (2013.01); *H04M 1/0269* (2022.02); *H04M 1/04* (2013.01)

(58) Field of Classification Search
CPC .... H04B 1/3888; H04M 1/04; H04M 1/0237; H04M 1/185; H04M 1/0268
See application file for complete search history.

(56) References Cited

U.S. PATENT DOCUMENTS

| 2012/0242588 A1* | 9/2012 | Myers ................... G06F 1/1637 345/173 |
| 2018/0041237 A1* | 2/2018 | Mody ..................... H04M 1/04 |
| 2020/0348727 A1* | 11/2020 | Lee ........................ G06F 1/1624 |
| 2021/0219437 A1* | 7/2021 | Kim ....................... G06F 1/1624 |
| 2022/0167512 A1* | 5/2022 | Ahn ....................... G06F 1/1652 |

FOREIGN PATENT DOCUMENTS

| JP | 2012134971 | 7/2012 |
| KR | 1020110062602 | 6/2011 |
| KR | 101421220 | 7/2014 |
| KR | 1020170000309 | 1/2017 |
| KR | 1020170081559 | 7/2017 |
| KR | 200487851 | 11/2018 |
| KR | 20200124793 A * | 4/2020 ........... G06F 1/1652 |

OTHER PUBLICATIONS

PCT International Application No. PCT/KR2020/004953, International Search Report dated Jan. 13, 2021, 10 pages.

* cited by examiner

*Primary Examiner* — Yuwen Pan
*Assistant Examiner* — Fatuma G Sherif
(74) *Attorney, Agent, or Firm* — LEE, HONG, DEGERMAN, KANG & WAIMEY PC

(57) ABSTRACT

The present disclosure relates to a flexible display device case that is mounted to a flexible display device including a first body and a second body configured to be movable relative to the first body, and including a first member mounted to the first body to surround a side surface portion of the first body, and a second member mounted to the second body to surround a side surface portion of the second body, wherein an area overlapped by the first member and the second member changes as the first body and the second body move relative to each other.

8 Claims, 14 Drawing Sheets

(a)

(b)

(a)

(b)

(a)

(b)

(a)

(b)　　　　(c)　　　　(d)

CASE OF FLEXIBLE DISPLAY DEVICE

CROSS-REFERENCE TO RELATED APPLICATIONS

Pursuant to 35 U.S.C. § 119 (a), this application claims the benefit of an earlier filing date and right of priority to International Application No. PCT/KR2020/004953 filed on Apr. 13, 2020, the contents of which are hereby incorporated by reference herein in its entirety.

TECHNICAL FIELD

The present disclosure relates to a case of a flexible display device that protects the flexible display device from outside.

BACKGROUND ART

A portable electronic device (hereinafter, a mobile terminal) such as a communication terminal, a multimedia device, a portable computer, a game player, and a photographing device is provided with a display to display image information. A mobile terminal may also have a folding structure that can be folded into a smaller size for convenience of portability. In this type of electronic device, two bodies are connected by a folding structure (e.g., a hinge portion).

Since the related art display had a non-foldable structure, a structure in which a display is disposed over foldably connected two bodies could not be implemented. Therefore, a large screen could not actually be applied to an electronic device with a folding structure.

However, as a flexible display capable of bending has been developed recently, researches to apply a flexible display to a mobile terminal are being conducted, and thus, it is possible to implement a large screen on a device.

Such a flexible display device may realize various sizes of screen by using deformable characteristics of the flexible display. For example, a flexible display device that can be extended to a screen size desired by a user by allowing the flexible display to be drawn out of the device body to extend an area exposed outside may be considered.

Therefore, it is necessary to propose a mechanism of a flexible display device in which a screen may be exposed to a front surface and a rear surface of a frame, respectively, and consider a method in which two frames (bodies) do not deviate from each other while providing smooth movement of the flexible display.

Here, as the two frames (bodies) move closer to each other or move away from each other, there is a need for a case that is mounted on each body and simultaneously protects the two bodies while simultaneously responding to the movements of the two bodies.

In addition, such a case needs to prevent a risk of damage to components that move the two frames (bodies) of the flexible display device when the flexible display device falls toward a ground while the two bodies are in a state disposed away from each other.

DETAILED DESCRIPTION OF THE DISCLOSURE

Technical Problem

A first aspect of the present disclosure is to provide a flexible display device case capable of reducing damage to internal components due to an external shock after two frames (bodies) of the flexible display device are moved away from each other.

A second aspect of the present disclosure is to provide a flexible display device case capable of reducing damage to internal components due to an external shock, especially when falling in a direction of gravity.

Technical Solution

To achieve the above aspect and other advantages of the present disclosure, there is provided a flexible display device case that is mounted to a flexible display device including a first body and a second body configured to be movable relative to the first body, including a first member mounted to the first body to surround a side surface portion of the first body, and a second member mounted to the second body to surround a side surface portion of the second body, wherein an area overlapped by the first member and the second member changes as the first body and the second body move relative to each other.

As another example, the first body and the second body may, respectively, be configured to implement a first state of being located adjacent to each other such that an area of the flexible display exposed to a rear surface of the second body is largest, and a second state of being moved away from each other such that an area of the flexible display exposed to a front surface of the first body is largest, wherein the first member and the second member may be configured such that an area overlapping each other is largest in the first state, and the overlapping area is narrowed while changing from the first state to the second state.

As another example, the first member may include a first side surface portion surrounding a side surface of a long side of the first body, and a first guide portion formed perpendicular to the first side surface portion and extending to surround an upper surface or a lower surface of the first body.

As another example, the second member may include a second side surface portion surrounding a side surface of a long side of the second body, and a second guide portion formed perpendicular to the second side surface portion and extending to surround an upper surface or a lower surface of the second body, wherein the second guide portion of the second member may be drawn into or out from the guide portion of the first member as first body and the second body are relatively moved between the first state and the second state.

As another example, the first member may further include a rear surface portion surrounding at least a part of a rear surface of the first body.

As another example, the first member may further include a stand pushed in or pulled out from the rear surface portion and fixable by an external force when pulled out.

As another example, the flexible display device case may further include a front surface glass disposed to cover front surfaces of the first member and the second member so as to surround a display exposed to the front surfaces of the first body and the second body.

As another example, the front surface glass may include a first front surface glass fixed by the first side surface portion and the first guide portion of the first member, and a second front surface glass fixed by the second side surface portion and the second guide portion of the second member.

As another example, the first front surface glass and the second front surface glass may be configured such that adjacent side surfaces of the first front surface glass and the second front surface glass contact each other in the first state, and the adjacent side surfaces of the first front surface glass and the second front surface glass are spaced apart from each other as being moved from the first state to the second state.

As another example, the first side surface portion and the second side surface portion may be provided with button holes formed at areas corresponding to buttons of the flexible display device to expose the buttons to outside.

As another example, the first guide portion and the second guide portion may be provided with at least one sensor hole to expose a speaker and a sensor disposed on a front surface and a rear surface of the flexible display device to outside.

As another example, the first member and the second member may further include a shock reducing portion, wherein the shock reducing portion may include a first plate having a first slit formed long in one direction, a second plate in which a part thereof overlaps the first plate and having a second slit formed in a direction same as the direction in which the first slit is formed, and an engaging member configured to be rotatable in one direction, and having an engaging surface inserted into the first slit and the second slit, wherein the first plate and the second plate may be configured to be disposed adjacent to each other in the first state so that the second slit is covered by the first plate, and be moved away from each other in the second state so that the first slit and the second slit communicate with each other, and wherein the engaging surface of the engaging member may be inserted into the first slit and the second slit in the second state so as to prevent the first plate and the second plate from being moved away or closer by an external force.

As another example, the engaging member may be configured to be rotated as the first plate and the second plate are disposed in the second state and arranged side by side in a gravitational direction.

As another example, the engaging member may include a main surface that is inclined with respect to the first plate in the first state, and wherein the engaging surface may be bent at an end portion of the main surface and extend in a direction toward the first plate.

As another example, the engaging member further include a moving object configured to be moved on the main surface to induce rotation of the engaging member by pressing the engaging member.

As another example, the moving object may be configured to be moved on the main surface as the first plate and the second plate are spaced apart in a gravitational direction, and press the main surface so that the engaging member rotates centering on a pin member when the moving object is moved beyond a predetermined position on the main surface.

As another example, the shock reducing portion may further include a cover configured to cover the first plate, and the cover may be provided with a guide groove to guide a movement of the second plate.

As another example, the cover may include fixing surfaces into which the first plate is fitted to be fixed, and a cover surface to connect the fixing surfaces disposed on both sides, wherein an inner side of the cover surface may have a path groove bent along a path of a movement of the moving object.

As another example, the path groove may include a first zone formed in which a main surface of the engaging member corresponds to an inclination formed with respect to the second plate, and a second zone bent at a boundary of the first zone and the second zone and declined to be closer to the first plate, wherein the moving object passes through the first zone and is guided along a surface in the second zone, then presses the engaging member so that the engaging member rotates.

Advantageous Effects

Effects of the present disclosure to be obtained by the above-described solutions are as follows.

A first member and a second member are configured to be mounted on side surfaces of a first body and a second body, which are movable relative to each other between a first state and a second state, and at the same time, a first guide portion and a second guide portion are drawn into or out from each inner side thereof as the first body and the second body move. Accordingly, the first member and the second member are also movable relative to each other. And, as the first member and the second member are moved corresponding to the movement of the first body and the second body, it may provide high convenience.

A flexible display device case has an advantage of supporting and standing a flexible display device and the flexible display device case with respect to a ground by including a stand that is pushed in or pulled out from the rear surface portion.

An engaging surface of an engaging member of a shock reducing portion is inserted into a first slit and a second slit in the second state to prevent a first plate and a second plate from being moved away or closer to each other by an external force. Accordingly, since the first plate and the second plate are not moved away or closer to each other even if an external force is applied to the shock reducing portion, the flexible display device case can absorb the external force. Accordingly, an impact transmitted to the flexible display device connected to the flexible display device case can be reduced.

Since, among the external forces applied to the second member, an amount of external force transmitted to the engaging member and the first member is increased, external force applied to the second body disposed inside the second member may be relatively reduced. Accordingly, when the first body and the second body of the flexible display device are disposed in the second state, an impact applied to the second body can be reduced.

In addition, when the first plate and the second plate are disposed in the second state and also disposed vertically in a gravitational direction, the first plate and the second plate are fixed to each other by a movement of a moving object. Therefore, it is advantageous that the first plate and the second plate are not fixed to each other when simply arranged in the second state. Furthermore, the first plate and the second plate are automatically fixed to each other without additional control while the flexible display device is falling toward the ground, and this may result in reducing an impact.

Figure 2:
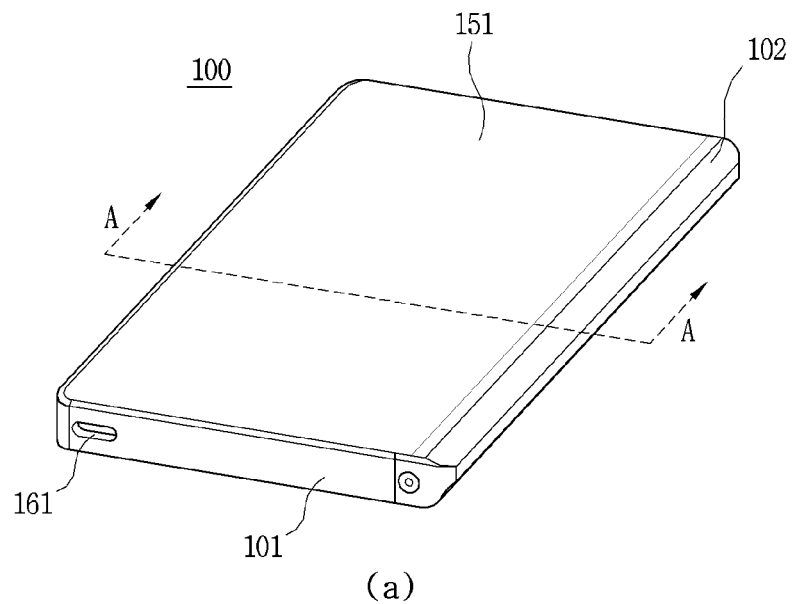
Figure 2:
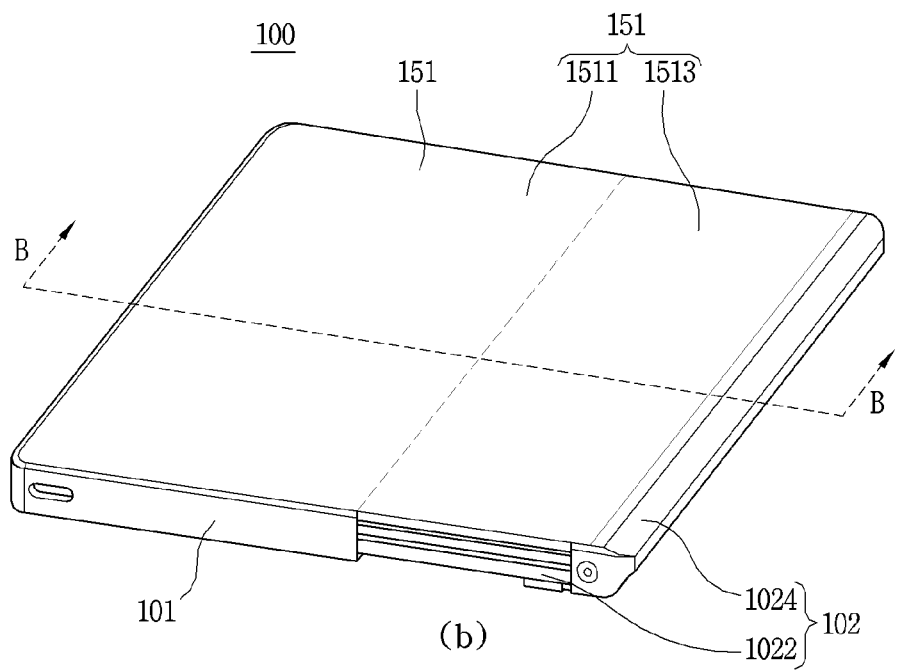

(a) and (b) of FIG. 2 are perspective views illustrating an exterior appearance of a front surface of the flexible display device in a first state and in a second state, respectively.

Figure 3:
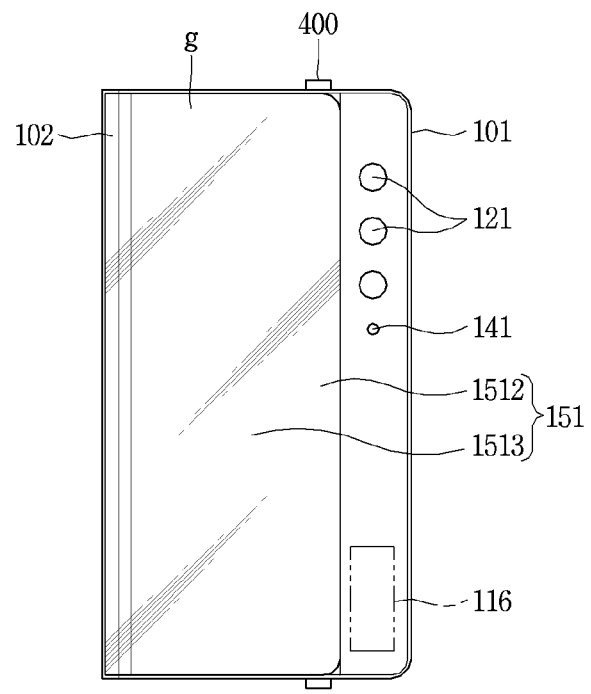
Figure 3:
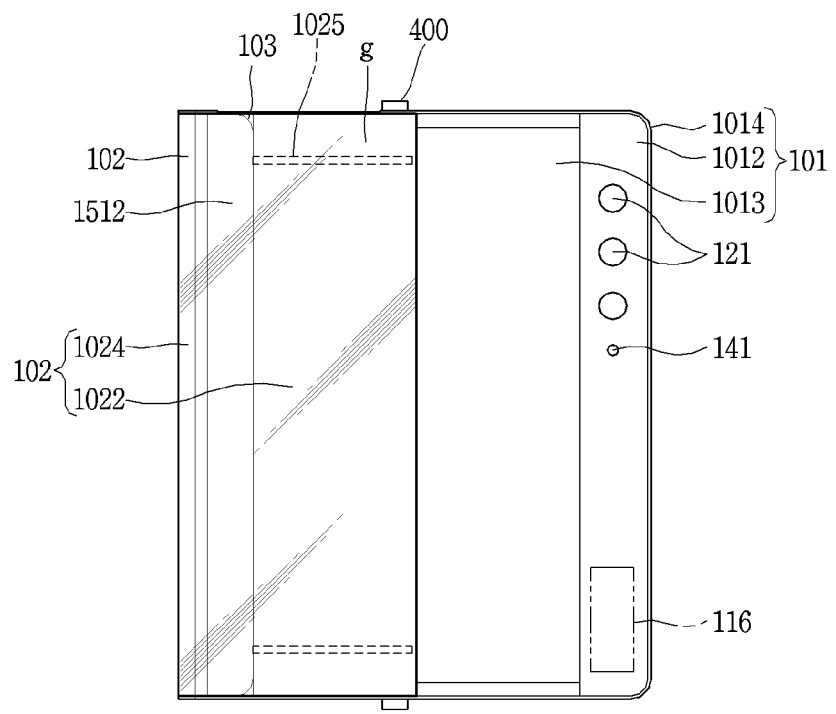

(a) and (b) of FIG. 3 are perspective views illustrating an exterior appearance of a rear surface of the flexible display device in the first state and in the second state, respectively.

Figure 4A:
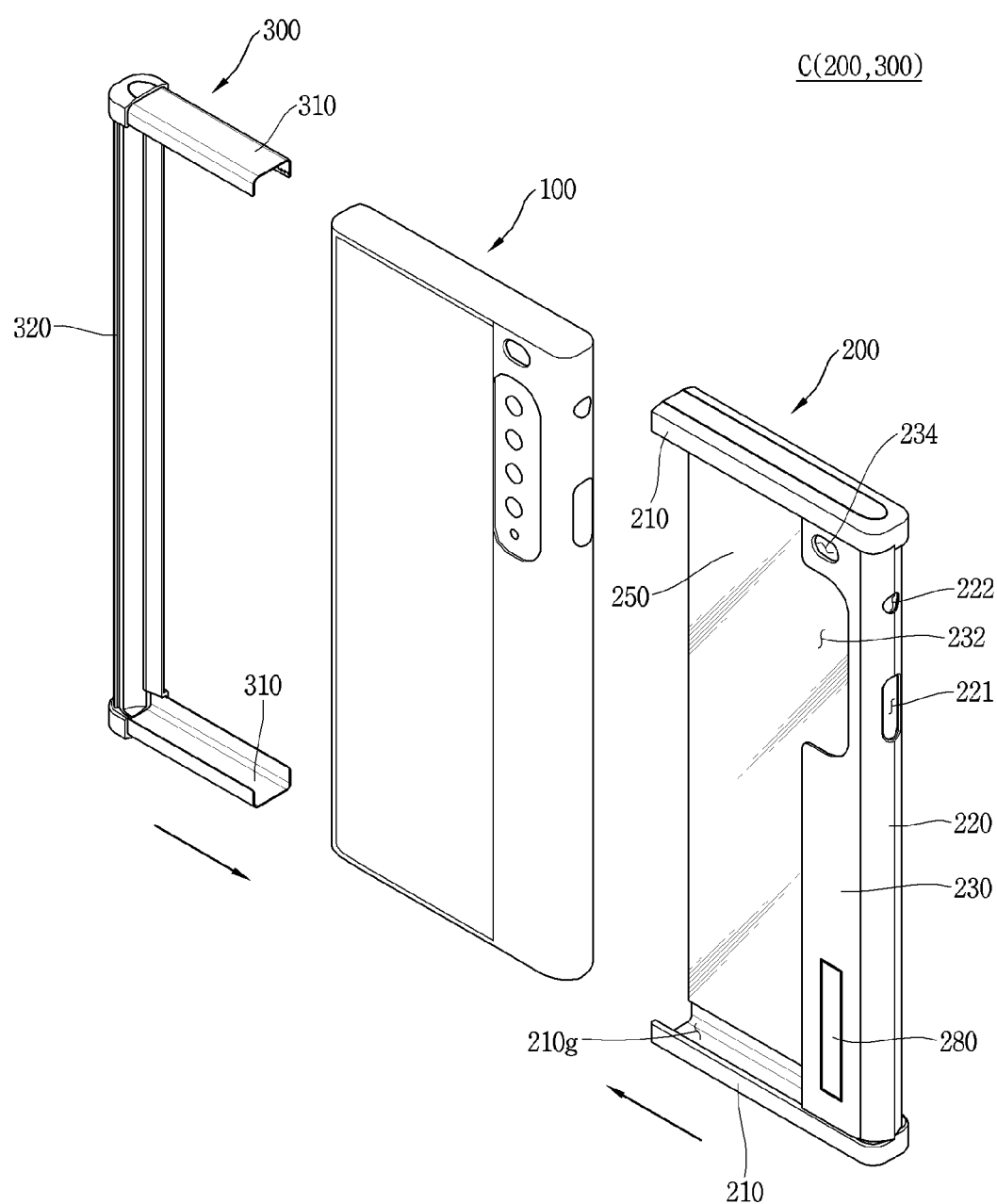

FIG. 4A is a perspective view of a case according to an embodiment of the present disclosure being mounted on a flexible display device.

Figure 4B:
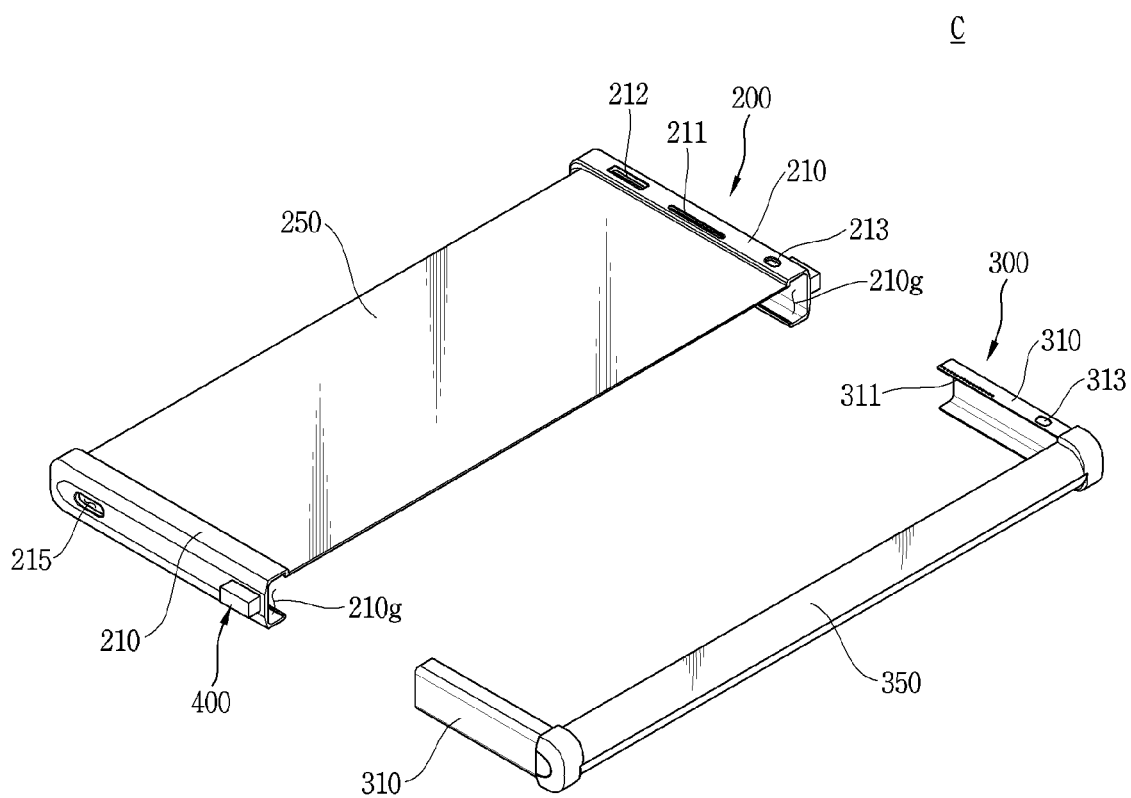

FIG. 4B is a perspective view illustrating the case of FIG. 4A viewed from a front side.

Figure 5:
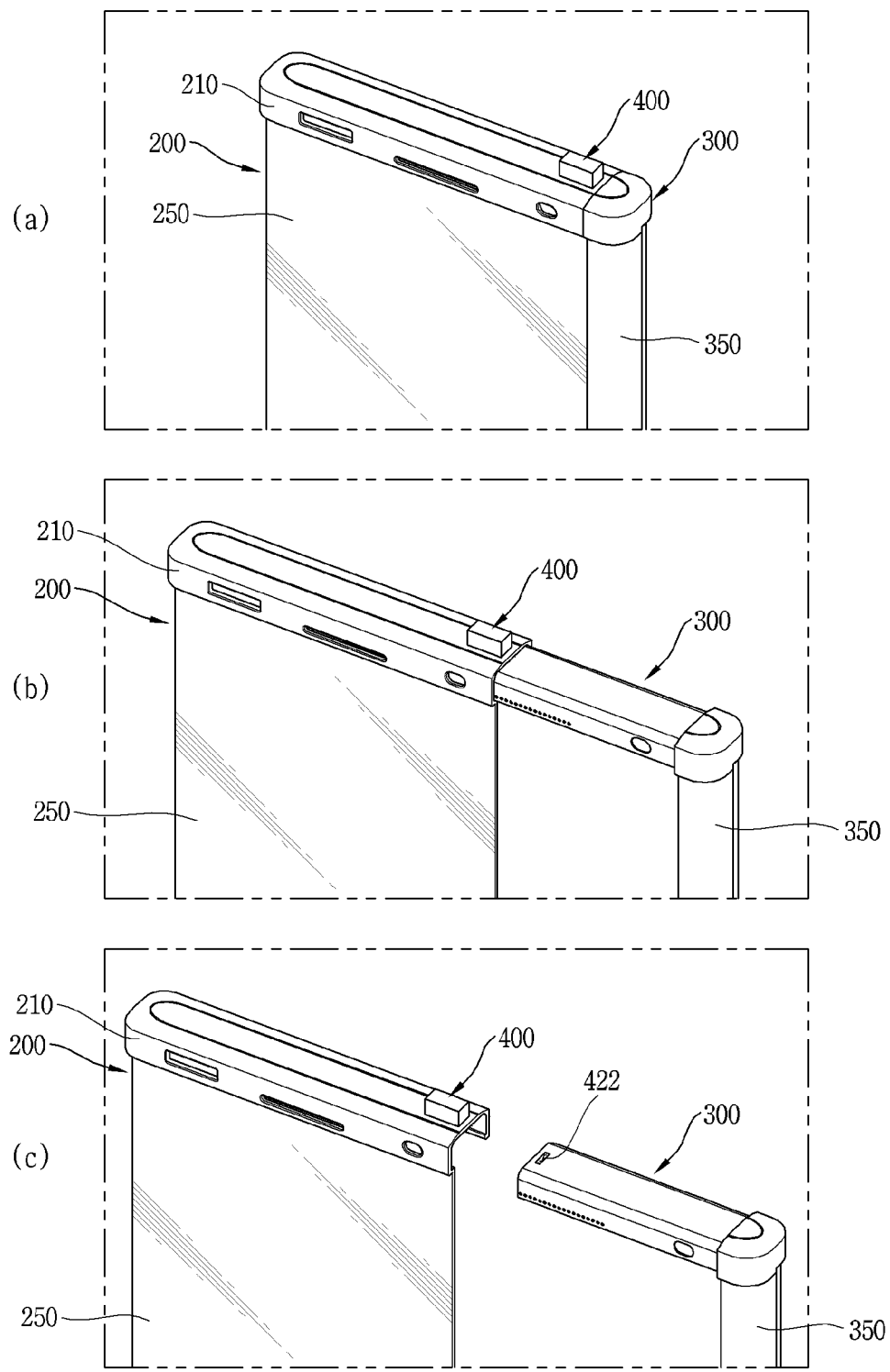

(a) to (c) of FIG. 5 are perspective views, respectively, illustrating states in which a first member and a second member of the case of FIG. 4A are disposed in a first state, disposed in a second state, and separated from each other.

Figure 6:
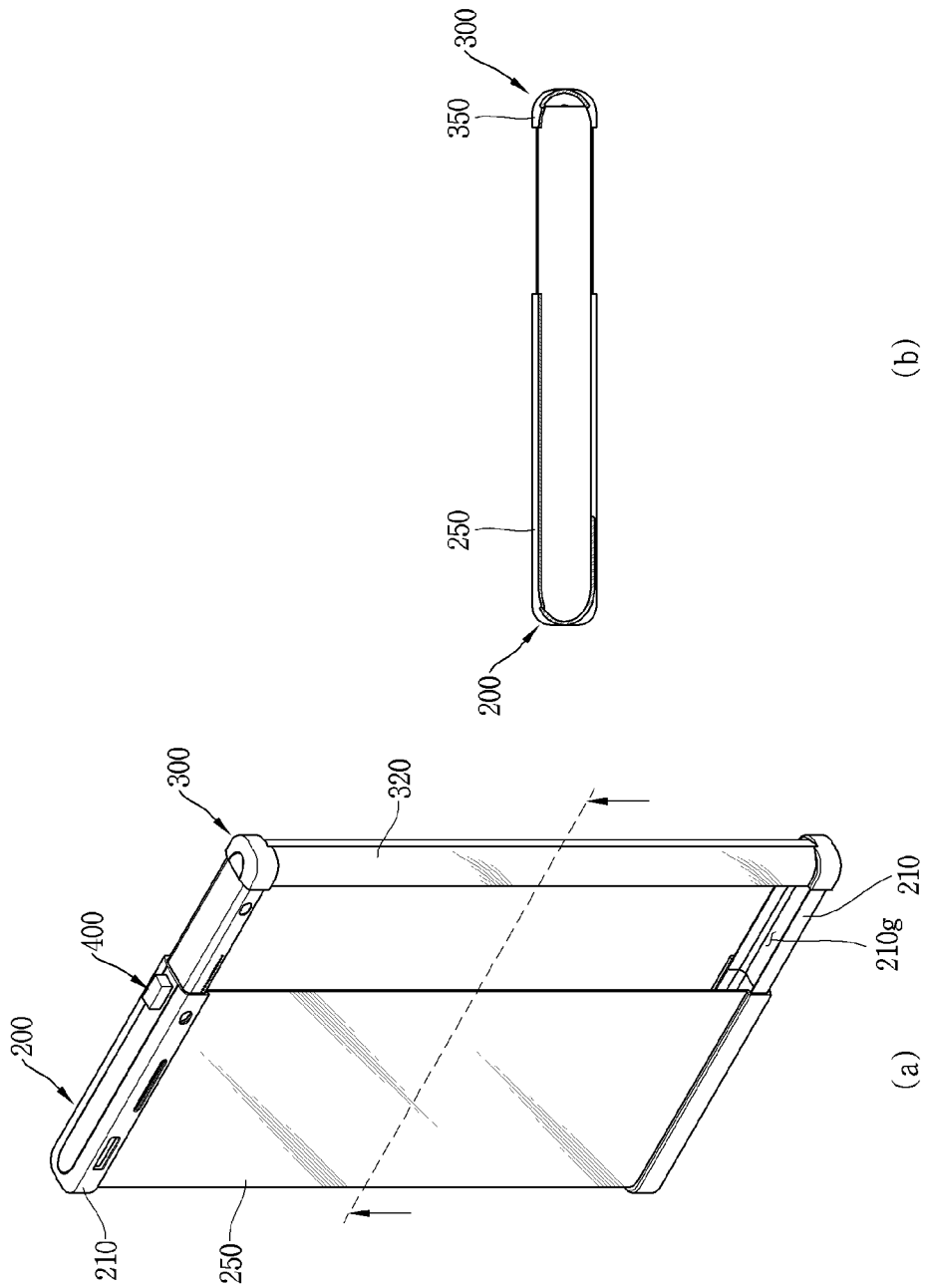

FIG. 6 is a view illustrating (b) of FIG. 5 and a cut state thereof.

Figure 7:
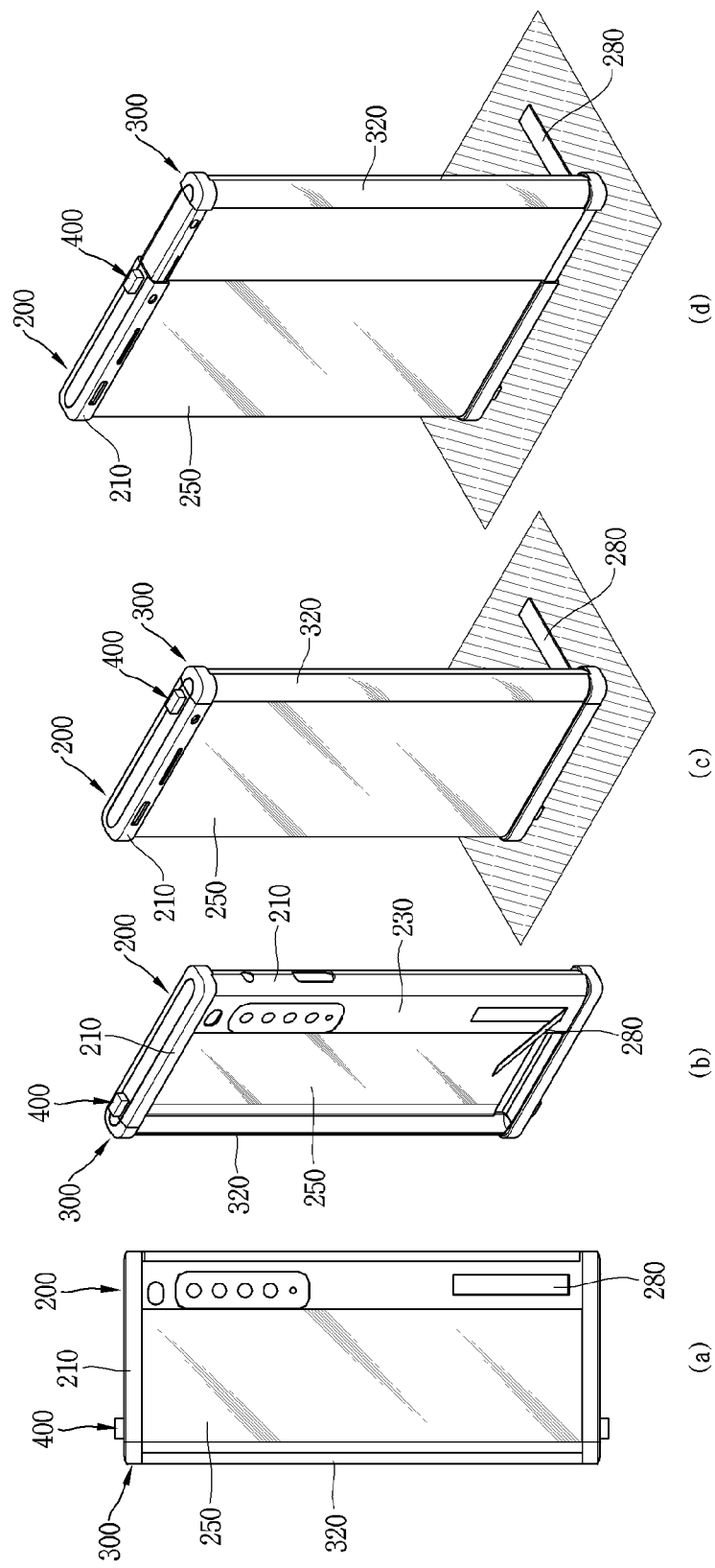

FIG. 7 is a view illustrating a state in which a case according to an embodiment of the present disclosure is standing upright using a stand.

Figure 8:
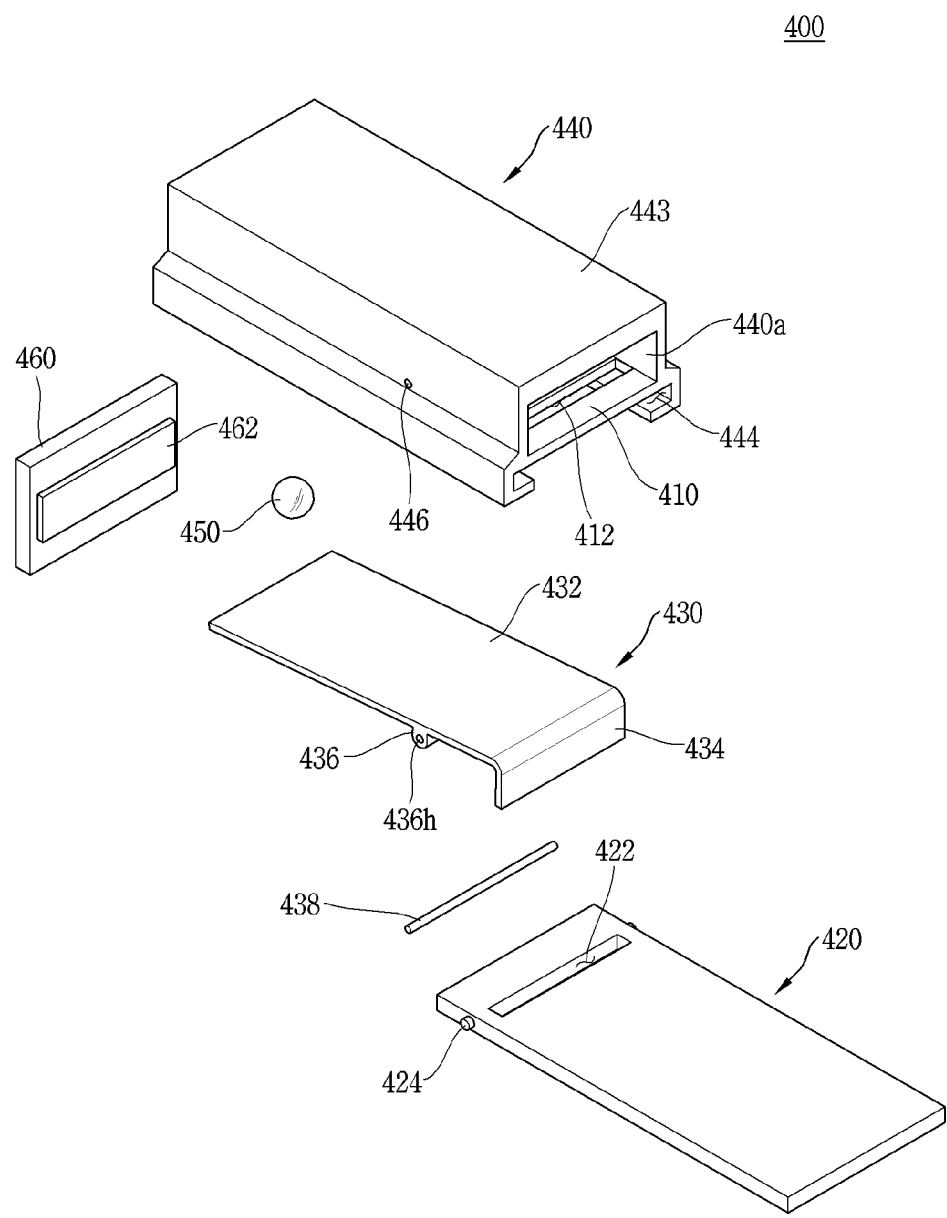

FIG. 8 is an exploded perspective view of a shock reducing portion according to an embodiment of the present disclosure.

Figure 9:
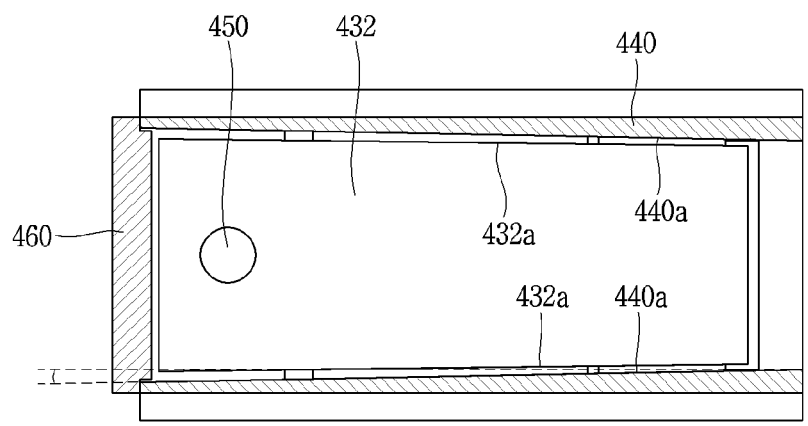
Figure 9:
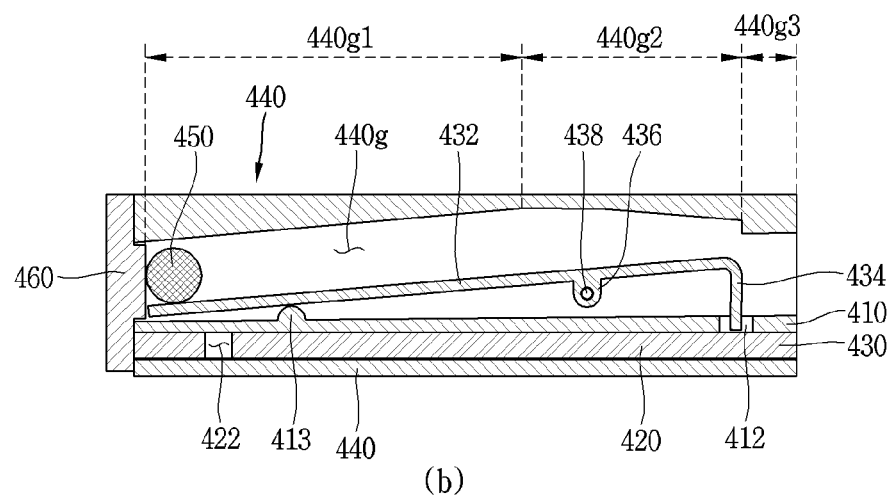

FIG. 9 is a cross-sectional view illustrating the shock reducing portion of FIG. 8 viewed from different directions.

Figure 10A:
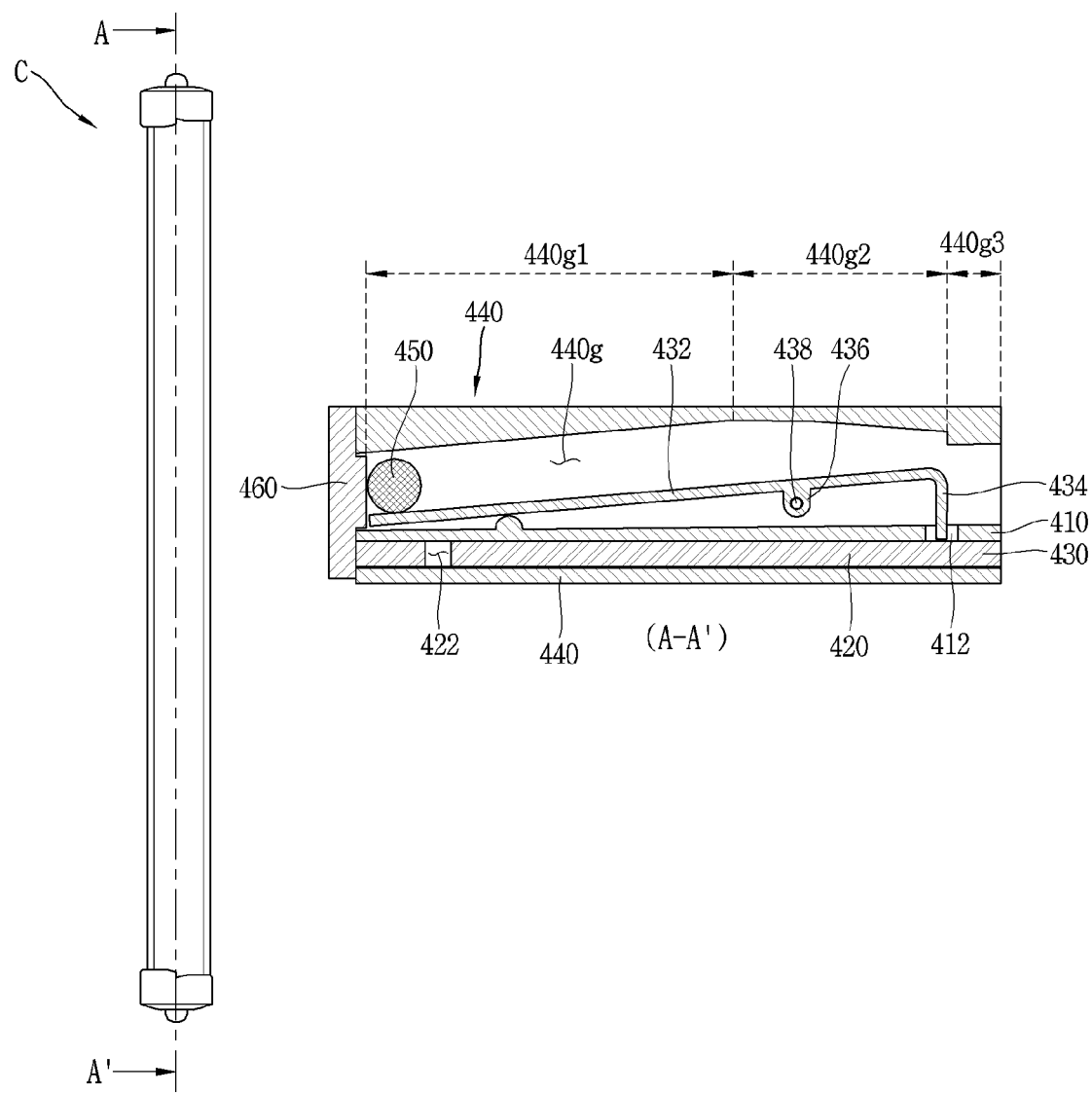
Figure 10B:
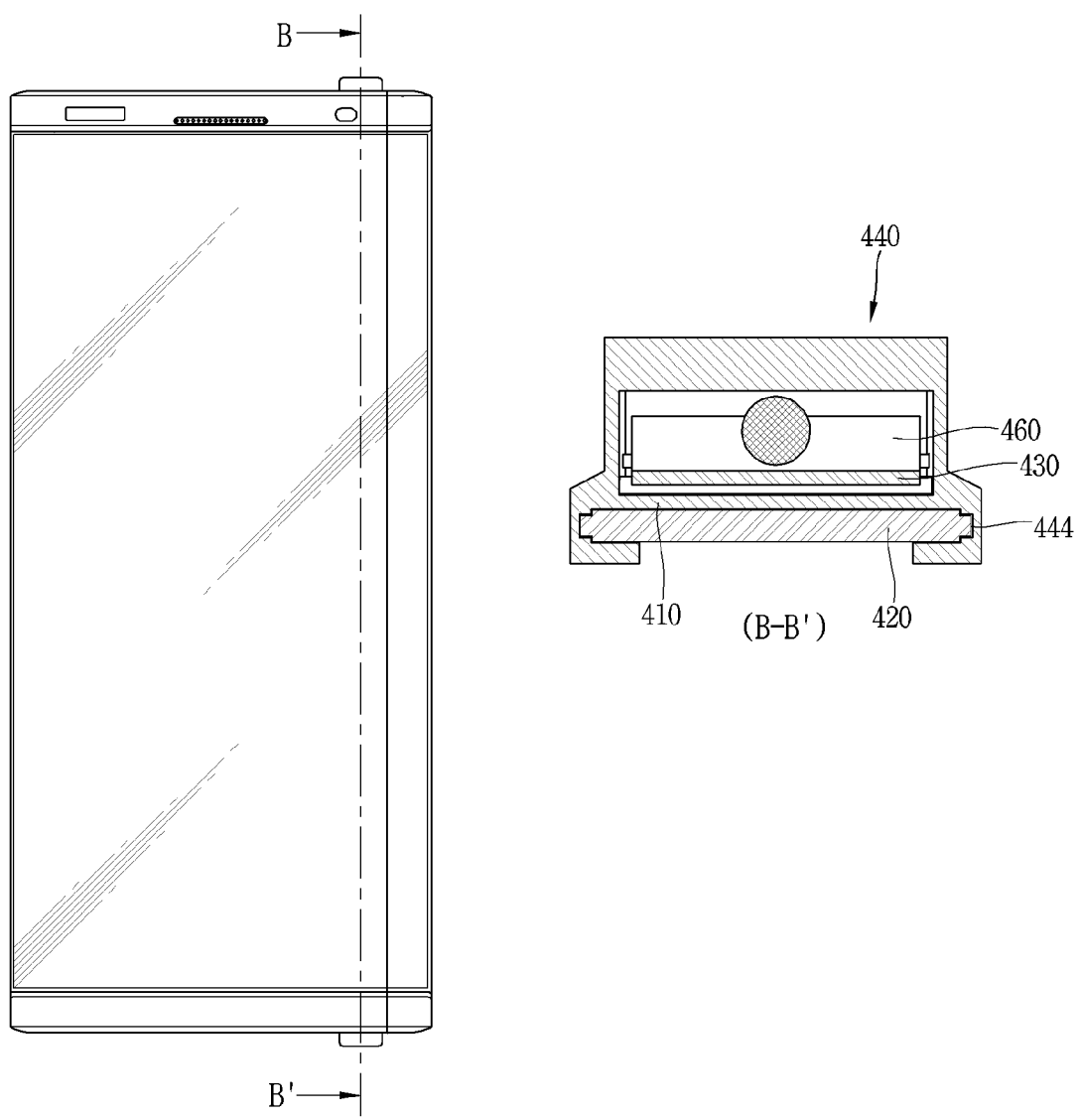

FIGS. 10A and 10B are cross-sectional views illustrating the shock reducing portion mounted on the case viewed from different directions.

Figure 11:
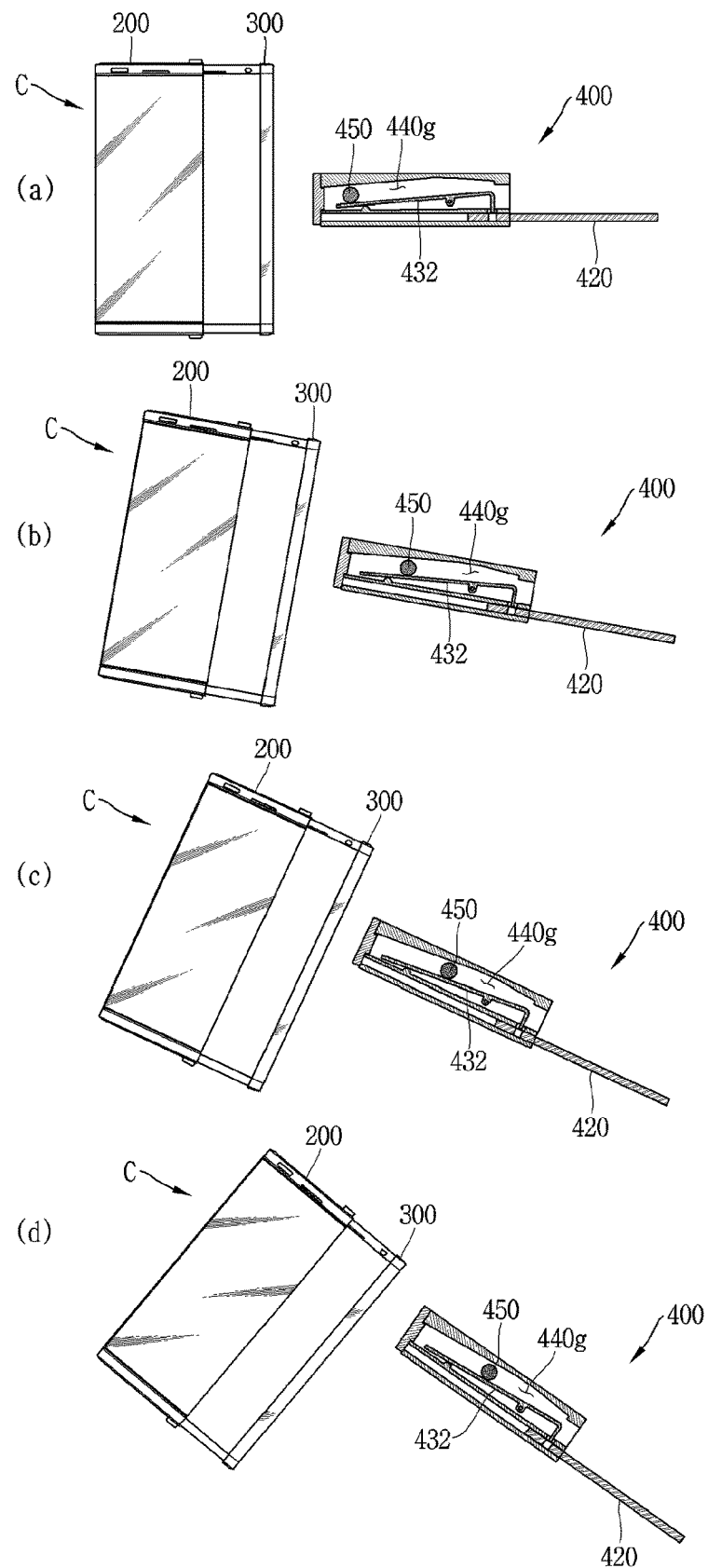

FIG. 11 is a conceptual view illustrating a state in which a moving object is moving inside the shock reducing portion while the case is falling.

Figure 12:
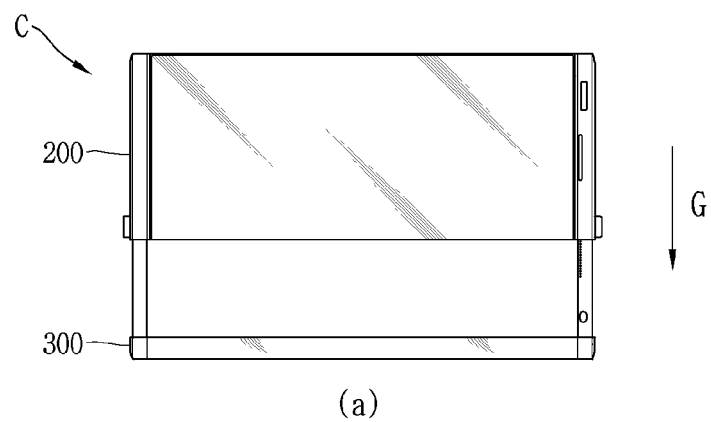
Figure 12:
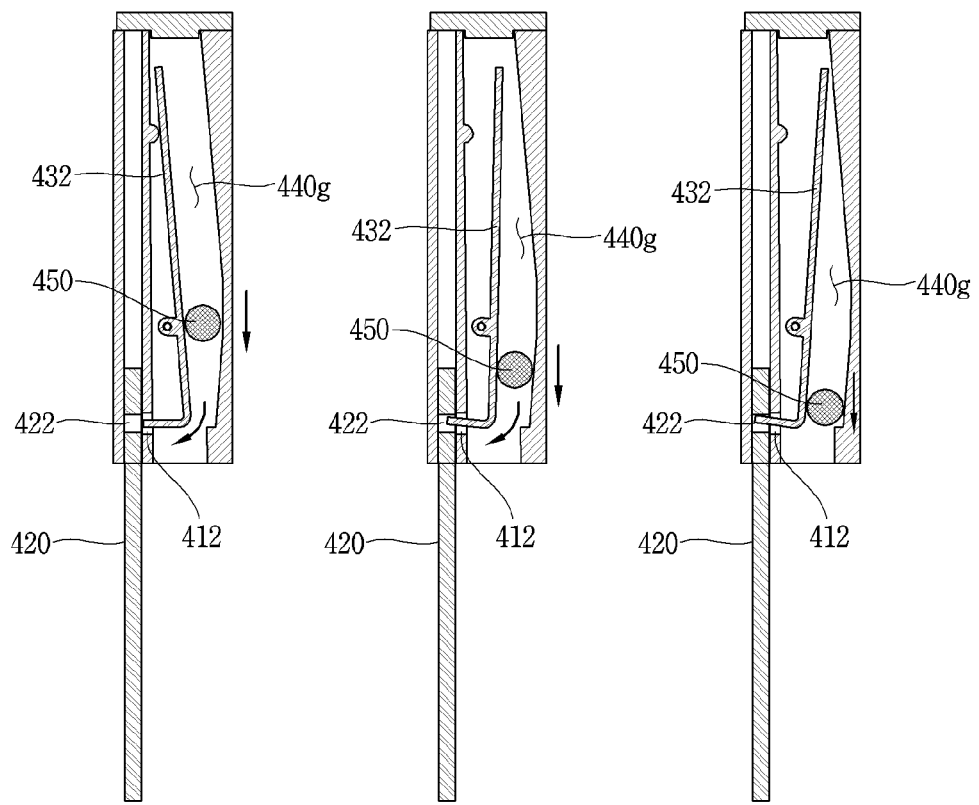

FIG. 12 is a conceptual view illustrating a state in which the moving object in the shock reducing portion moves to rotate an engaging member while a first member and a second member of the case are arranged side by side in a gravitational direction.

MODES FOR CARRYING OUT PREFERRED EMBODIMENTS

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Display devices presented herein may be implemented using a variety of different types of terminals. Examples of such devices include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like. Hereinafter, for convenience of description, the mobile terminal will be described as one example of the flexible display device.

Figure 1:
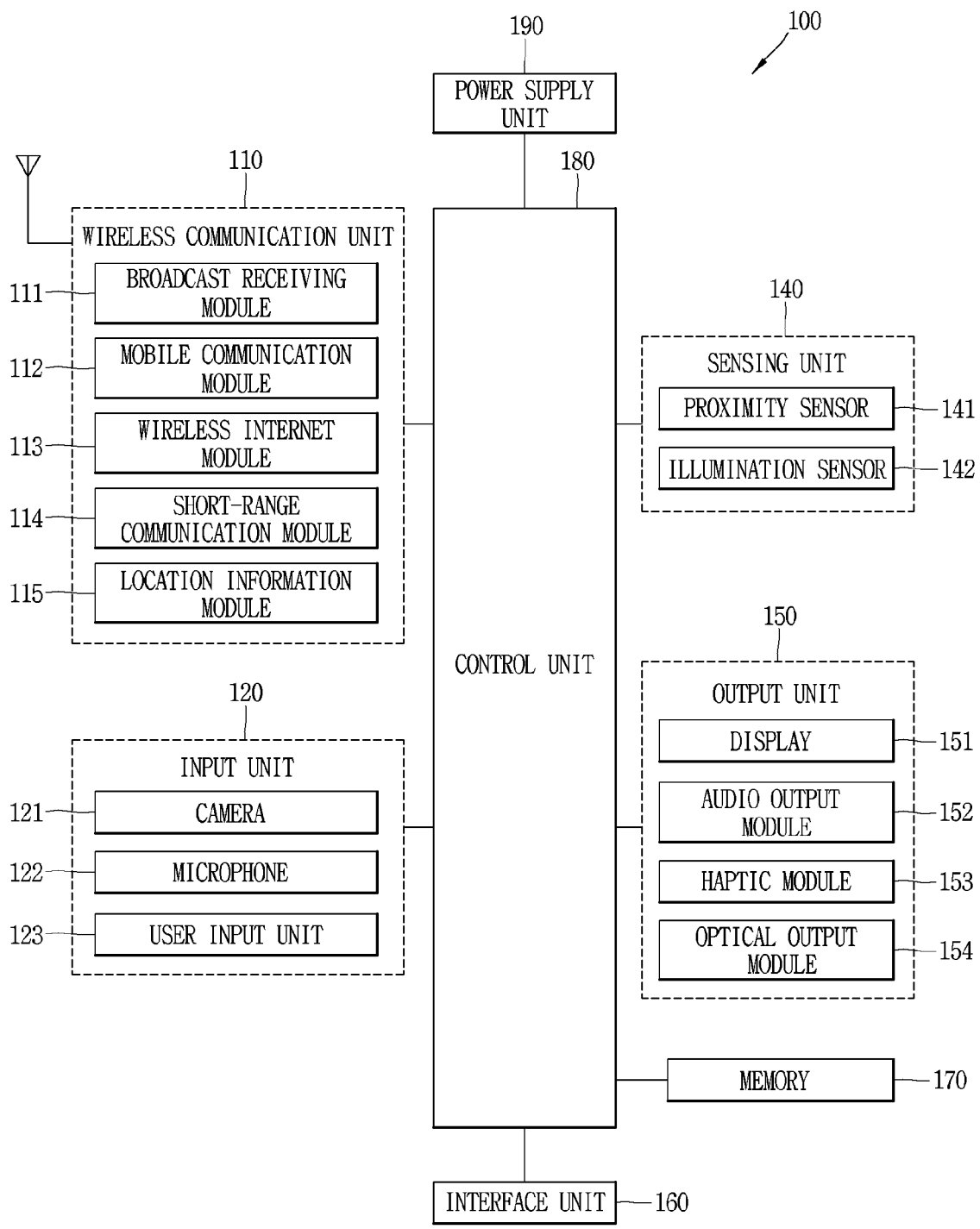
FIG. 1 is a block diagram of a mobile terminal in accordance with the present disclosure.

FIG. 1 is a block diagram of a mobile terminal in accordance with the present disclosure.

The mobile terminal (flexible display device, 100) may include a wireless communication unit 110, an input unit 120, a sensing unit 140, an output unit 150, an interface unit 160, a memory 170, a controller 180, and a power supply unit 190. It is understood that implementing all of the illustrated components is not a requirement. Greater or fewer components may alternatively be implemented.

In more detail, the wireless communication unit 110 may typically include one or more modules which permit communications such as wireless communications between the mobile terminal 100 and a wireless communication system, communications between the mobile terminal 100 and another mobile terminal, or communications between the mobile terminal 100 and an external server. Further, the wireless communication unit 110 may typically include one or more modules which connect the mobile terminal 100 to one or more networks.

The wireless communication unit 110 may include one or more of a broadcast receiver 111, a mobile communication module 112, a wireless Internet module 113, a short-range communication module 114, and a location information module 115.

First, regarding the wireless communication unit 110, the broadcast receiver 111 is configured to receive a broadcast signal and/or broadcast associated information from an external broadcast managing server via a broadcast channel. The broadcast channel may include a satellite channel, a terrestrial channel, or both. In some embodiments, two or more broadcast receivers may be utilized to facilitate simultaneous reception of two or more broadcast channels, or to support switching among broadcast channels.

The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal in a form that a TV or radio broadcast signal is combined with a data broadcast signal.

The broadcast signal may be encrypted by at least one of technical standards (or broadcasting methods, e.g., ISO, IEC, DVB, ATSC, etc.) for transmitting and receiving a digital broadcast signal. The broadcast receiving module 111 may receive the digital broadcast signal using a method suitable for a technical standard selected from those technical standards.

Examples of the broadcast associated information may include information associated with a broadcast channel, a broadcast program, a broadcast service provider, and the like. The broadcast associated information may be provided via a mobile communication network. In this case, the broadcast associated information may be received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like. The broadcast signal and/or the broadcast related information received through the broadcast receiving module 111 may be stored in the memory 160.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

The wireless signal may include various types of data depending on a voice call signal, a video call signal, or a text/multimedia message transmission/reception.

The wireless Internet module 113 refers to a module for wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well.

When the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area network.

Here, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position (or current position) of the mobile terminal. As an example, the location information module 115 includes a Global Position System (GPS) module, a Wi-Fi module, or both. For example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the mobile terminal. The location information module 115 is a module used for acquiring the position (or the current position) and may not be limited to a module for directly calculating or acquiring the position of the mobile terminal.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

Such cameras 121 may process image frames of still pictures or video obtained by image sensors in a video or image capture mode. The processed image frames can be displayed on the display 151 or stored in memory 170. Meanwhile, the cameras 121 may be arranged in a matrix configuration to permit a plurality of images having various angles or focal points to be input to the mobile terminal 100. Also, the cameras 121 may be located in a stereoscopic arrangement to acquire left and right images for implementing a stereoscopic image.

The microphone 122 processes an external audio signal into electric audio (sound) data. The processed audio data can be processed in various manners according to a function executed in the mobile terminal 100. The microphone 122 may include assorted noise removing algorithms to remove unwanted noise generated in the course of receiving the external audio signal.

The user input unit 123 is a component that receives an input of information from a user. Such user input may enable the controller 180 to control operation of the mobile terminal 100 in correspondence with the received information. The user input unit 123 may include one or more of a mechanical input element (for example, a mechanical key, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like, and generate a corresponding sensing signal. The controller 180 generally cooperates with the sending unit 140 to control operations of the mobile terminal 100 or execute data processing, a function or an operation associated with an application program installed in the mobile terminal based on the sensing signal. The sensing unit 140 may be implemented using any of a variety of sensors, some of which will now be described in more detail.

For example, the sensing unit 140 may include at least one of a proximity sensor 141, an illumination sensor 142, a touch sensor, an acceleration sensor, a magnetic sensor, a G-sensor, a gyroscope sensor, a motion sensor, a red, green, and blue (RGB) sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein may be configured to utilize information obtained from two or more sensors of the sensing unit 140, and combinations thereof.

The proximity sensor 141 refers to a sensor to sense presence or absence of an object approaching a surface, or an object existing near a surface, by using an electromagnetic field, infrared light, or the like without a mechanical contact. The proximity sensor 141 may be arranged at an inner area of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 may sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data (or information) according to whether a touch with respect to a point on the touch screen is either a proximity touch or a contact touch.

The touch sensor senses a touch (or a touch input) applied to the touch screen using at least one of a variety of touch methods. Examples of such touch methods include a resistive type, a capacitive type, an infrared type, an ultrasonic type, and a magnetic field type, among others.

As one example, the touch sensor may be configured to convert changes of pressure applied to a specific part of the display 151, or convert capacitance occurring at a specific part of the display 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, a signal(s) corresponding to the touch input is transmitted to a touch controller. The touch controller may process the received signals, and then transmit corresponding data to the controller 180. Accordingly, the controller 180 may sense which area of the flexible display 151 has been touched. Here, the touch controller may be a component separate from the controller 180, the controller 180, and combinations thereof.

Meanwhile, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

In addition, the controller 180 may be a processor that drives various applications executed in the flexible display device. For example, various applications including a camera application executed in the flexible display device may be driven.

The touch sensor and the proximity sensor may be implemented individually, or in combination, to sense various types of touches. Such touches include a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize location information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121, which has been depicted as a component of the input unit 120, includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors (TRs) at rows and columns to scan content received at the photo sensor using an electrical signal which changes according to the quantity of applied light. Namely, the photo sensor may calculate the coordinates of the physical object according to variation of light to thus obtain location information of the physical object.

The flexible display 151 is generally configured to output information processed in the mobile terminal 100. For example, the flexible display 151 may display execution screen information of an application program executing at the mobile terminal 100 or user interface (UI) and graphic user interface (GUI) information in response to the execution screen information.

Also, the flexible display 151 may be implemented as a stereoscopic display for displaying stereoscopic images.

A typical stereoscopic display may employ a stereoscopic display scheme such as a stereoscopic scheme (a glass scheme), an auto-stereoscopic scheme (glassless scheme), a protrusion scheme (holographic scheme), or the like.

The output unit 150 may typically be configured to output various types of information, such as audio, video, tactile output, and the like. The output unit 150 may include at least one of the flexible display 151, an audio output module 152, a haptic module 153, and an optical output module 154. The flexible display 151 may have an inter-layered structure or an integrated structure with a touch sensor in order to implement a touch screen. The touch screen may function as the user input unit 123 which provides an input interface between the mobile terminal 100 and the user and simultaneously provide an output interface between the mobile terminal 100 and a user.

The audio output module 152 may receive audio data from the wireless communication unit 110 or output audio data stored in the memory 170 during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceives, or otherwise experiences. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented such that the mobile terminal emits monochromatic light or light with a plurality of colors. The signal output may be terminated as the mobile terminal senses that a user has checked the generated event, for example.

The interface unit 160 serves as an interface with various types of external devices that are coupled to the mobile terminal 100. The interface unit 160, for example, may include any of wired or wireless headset ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal therethrough. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 functions to control an overall operation of the mobile terminal 100, in addition to the operations associated with the application programs. The controller 180 may provide or process information or functions appropriate for a user by processing signals, data, information and the like, which are input or output by the aforementioned various components, or activating application programs stored in the memory 170.

Also, the controller 180 may control at least some of the components illustrated in FIG. 1A to execute an application program that have been stored in the memory 170. In addition, the controller 180 may control at least two of those components included in the mobile terminal 100 to activate the application program.

The power supply unit 190 may be configured to receive external power or provide internal power in order to supply appropriate power required for operating elements and components included in the mobile terminal 100. The power supply unit 190 may include a battery 191, and the battery may be configured to be embedded in the terminal body, or configured to be detachable from the terminal body.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

At least part of the components may cooperatively operate to implement an operation, a control or a control method of a mobile terminal according to various embodiments disclosed herein. Also, the operation, the control or the control method of the mobile terminal may be implemented on the mobile terminal by an activation of at least one application program stored in the memory 170.

(a) and (b) of FIG. 2 are perspective views illustrating an exterior appearance of a front surface of the flexible display device in a first state and in a second state, respectively. (a) and (b) of FIG. 3 are perspective views illustrating an exterior appearance of a rear surface of the flexible display device in the first state and in the second state, respectively.

The flexible display device related to the present disclosure is a device capable of varying in size of a screen due to a deformation of the flexible display, which may be understood as one of the above-described mobile terminals. In the present disclosure, the device will be referred to as a flexible display device 100.

The flexible display device 100 related to the present disclosure may include a first body 101, a second body 102, and the flexible display 151.

The first body 101 and the second body 102 may define an exterior appearance of the flexible display device 100. The first body 101 and the second body 102 are configured to be movable relative to each other. The first body 101 and the second body 102 may achieve the first state, the second state, and a stroke state.

Specifically, the first state is an arrangement state in which the first body 101 and the second body 102 are located adjacent to each other and have a largest area of the flexible display 151 exposed to a rear surface of the second body 102. The second state is an arrangement state in which the first body 101 and the second body 102 move away from each other and have a largest area of the flexible display 151 exposed to a front surface of the first body 101. The stroke state is a state in which the first body 101 and the second body 102 are interchanged between the first state and the second state.

The flexible display device 100 in the first state has a shorter length in a first direction than in the second state. Since the flexible display device 100 in the second state is extended in the first direction, a size of the flexible display 151 disposed on the front surface of the flexible display device 200 become larger than in the first state. A direction in which the flexible display device 100 is extended is referred to as a first direction, and a direction in which the flexible display device 200 is contracted so as to be changed from the second state to the first state is referred to as a second direction. And a direction perpendicular to the first direction and the second direction is referred to as a third direction.

The flexible display device 100 of the present disclosure may be changed from the first state in which a display is disposed on a front surface such as a bar-like mobile terminal to the second state by extending the screen as illustrated in (b) of FIG. 2. In the second state, the area of the flexible display 151 located at the front surface increases, and the area of the display located at the rear surface decreases as illustrated in (b) of FIG. 3. That is, the display, which was positioned on the rear surface in the first state, is moved to the front surface in the second state.

As such, the display may use the flexible display 151 that is bendable so as for the location of the display can be changed. The flexible display 151 refers to a durable display that is lightweight and does not break easily by being fabricated on a thin, flexible substrate, such as paper, which is bent, curved, folded, twisted or rolled while maintaining characteristics of an existing flat panel display.

In addition, an electronic paper is a display to which general ink characteristics are applied, and is different from the existing flat panel display in view of using reflected light. The electronic paper may change information by using a twist ball or electrophoresis using a capsule.

In a state where the flexible display 151 is not deformed (e.g., a state having an infinite radius of curvature, hereinafter, referred to as a default state), a display area of the flexible display 151 is flat. When the default state is switched to a state where the flexible display is deformed by an external force (e.g., a state having a finite radius of curvature, hereinafter, referred to as a deformed state), the display area may be curved. As illustrated in the drawing, information displayed in the deformed state may be visual information output on a curved surface. Such visual information is realized by independently controlling an emission of unit pixels (sub-pixels) arranged in a matrix form. The unit pixel denotes an elementary unit for representing one color.

The flexible display 151 may be deformed to a curved state (e.g., curved up or down, or left or right), other than a flat state, in the default state. When an external force is applied to the curved flexible display 151, the flexible display 151 may be deformed into the flat state (or less curved state) or a more curved state.

Meanwhile, the flexible display 151 may be combined with a touch sensor to implement a flexible touch screen. When a touch is applied to the flexible touch screen, the controller 180 (see FIG. 1) may perform a control corresponding to the touch input. The flexible touch screen may be configured to sense a touch input in the deformed state as well as in the default state.

The touch sensor senses a touch (or a touch input) applied to the touch screen using at least one of a variety of touch methods. Examples of such touch methods include a resistive type, a capacitive type, an infrared type, an ultrasonic type, and a magnetic field type, among others.

As one example, the touch sensor may be configured to convert changes of pressure applied to a specific part of the display 151, or convert capacitance occurring at a specific part of the display 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

Meanwhile, the flexible display device 100 related to the present disclosure may be provided with a deformation detecting unit to detect a deformation of the flexible display 151. The deformation detecting unit may be included in the sensing unit 140 (see FIG. 1).

The deformation detecting unit may be provided on the flexible display 151 or on a case 105 to detect information related to the deformation of the flexible display 151. Here, the information related to the deformation may be a direction in which the flexible display 151 is deformed, a deformed degree, a deformed position, a deformed time, and an acceleration at which the deformed flexible display 151 is restored. In addition, the information may be various which is detectable as the flexible display 151 is curved.

Also, the controller 180 may change information displayed on the flexible display 151 or generate a control signal to control functions of the flexible display device 100 based on the information related to the deformation of the flexible display 151 detected by the deformation detecting unit.

A state of the flexible display 151 is not always be changed by an external force. For example, when the flexible display 151 is in the first state, the flexible display 151 may be deformed to the second state by a command of an application or a user. As such, a driving unit may be further provided to deform the flexible display without an external force.

The flexible display 151 of the present disclosure may be bent 180 degrees, so as a part of which to be located at the front surface of the flexible display device 100, and a part of which to be located in the rear surface of the flexible display device 100. Since a size of an entire area of the flexible display 151 is fixed, when the area of the flexible display 151 located on the front surface of the flexible display device 100 increases, the area of the flexible display 151 located on the rear surface of the flexible display device 200 relatively decreases.

As the flexible display 151 is disposed up to the rear surface of the flexible display device 100, in addition to the front surface of the flexible display device 200, a space where an antenna implemented in a rear case in the related art to be mounted is limited. Accordingly, the antenna may be implemented on the flexible display 151 instead of mounting the antenna in the rear case.

A display built-in antenna (AOD, Antenna on Display) is an antenna in which patterned electrode layers and dielectric layers form a transparent film. The display built-in antenna can be implemented thinner than the related art antenna implemented by copper-nickel plating laser direct structuring (LDS) technology, which has an advantage of not appearing outside and barely affecting the thickness. In addition, the display built-in antenna is able to transmit and receive a signal in a direction in which the display is located. Such a display built-in antenna may be used in a terminal having a display on both sides as in the present disclosure.

Referring to FIG. 3, the rear window unit g may be coupled to the second body 102. When the second body 102 is moved relative to the first body 101 so as for the first body 101 and the second body 102 to achieve the second state, the rear window unit g is moved together with the second body 102.

The rear window unit g may be mounted on the second body 102 to protect the flexible display 151 disposed on the rear surface from outside. In addition, the rear window unit g may be detached from the second body 102 to expose the flexible display 151. In this manner, a user may remove dust or the like introduced between the rear window unit g and the flexible display 151. On the other hand, unlike the description above, the rear window portion g may not be provided.

Meanwhile, a flexible display device case C configured to protect the first body 101 and the second body 102 may be fitted to the flexible display device 100 related to the present disclosure. Hereinafter, the flexible display device case C of the present disclosure will be described with reference to the drawings.

The flexible display device case C will be described in detail with reference to FIG. 4 and the drawings below.

FIG. 4A is a perspective view of the case according to an embodiment of the present disclosure being mounted on the flexible display device. FIG. 4B is a perspective view illustrating the case of FIG. 4A viewed from a front side. (a) to (c) of FIG. 5 are perspective views, respectively, illustrating states in which a first member and a second member of the case of FIG. 4A are disposed in the first state, disposed in the second state, and separated from each other.

As described above, the flexible display device 100 may include the first body 101, the second body 102 configured to be movable relative to the first body 101, and a flexible display configured such that a size of an area exposed to the front surface of the first body 101 and a size of an area exposed to the rear surface of the second body 102 vary as the first body 101 and the second body 102 are moved relative to each other.

The flexible display device case C may include a first member 200 and a second member 300. Specifically, as illustrated in FIG. 4A, the flexible display device case C may be fitted to the flexible display device 100 to surround the flexible display device 100. That is, the first member 200 may surround a side surface of the first body 101, and the second member 300 may surround a side surface of the second body 102.

The first body 200 and the second body 300 may achieve the first state and the second state. Here, the first state and the second state of the case C may be a state in which the first body 101 and the second body 102 of the flexible display device 100 to which the case C is mounted are disposed when achieving the first state and the second state.

Referring to FIGS. 4A and 4B, the first member 200 may include a first guide portion 210, a first side surface portion 220, a rear surface portion 230, and a first front surface glass 250.

The first guide portion 210 of the first member 200 may surround an upper side and a lower side of the first body 101 of the flexible display device 100. The first guide portion 210 may be formed perpendicular to the first side surface portion 220 and may extend to surround an upper surface or a lower surface of the first body 101.

A guide portion groove 210g may be formed in the first guide portion 210 so that the first body 101 of the flexible display device 100 is fitted into the guide portion groove 210g of the first guide portion 210. Further, a second guide portion 310 of the second member 300 may be fitted into the guide portion groove 210g and be drawn in or out from the guide portion groove 210g.

Referring to FIG. 4B, the first guide portion 210 may be provided with at least one sensor hole 212 and 213 exposing a speaker and sensors disposed on the front surface and the rear surface of the flexible display device to outside.

Specifically, a speaker hole 211 to expose the speaker and sensor holes 212 and 213 to expose the sensor may be provided on an upper front surface of the first guide portion 210. In addition, a terminal hole 215 to connect the flexible display device 100 and a terminal may be further provided at a lower portion of the first guide portion 210.

The first side surface portion 220 of the first member 200 may surround the side surface of the first body 101 of the flexible display device 100.

As illustrated in FIG. 4A, button holes 221 and 222 may be formed at the first side surface portions 220 at areas corresponding to buttons of the flexible display device 100 to expose the buttons.

The first member 200 may further include a rear surface portion 230 surrounding at least a part of a rear surface of the first body 101. The rear surface portion 230 may cover a part of the rear surface of the first body 101. A sensor hole 234 to expose various sensors and a camera hole 232 to expose the camera may be provided at the rear surface portion 230 of the first member 200.

Meanwhile, the first member 200 may include a stand 280 pushed in or pulled out from the rear surface portion 230 of the first member 200, and fixable by an external force when pulled out. The stand 280 may be pushed in or pulled out from the rear surface portion 230 to make the flexible display device 100 stand upright. However, as described above, when the rear surface of the first body 101 is not provided, the rear surface portion 230 of the first member 200 may not be provided.

The second member 300 may include the second guide portion 310, a second side surface portion 320, and a second front surface glass 350.

The second side surface portion 320 surrounds a side surface of a long side of the second body 102. The second guide portion 310 may be formed perpendicular to the second side surface portion 320 and may extend to surround an upper surface or a lower surface of the second body 102. The second guide portion 310 of the second member 300 may be drawn into or out from the first guide portion 210 of the first member 200 as first body 101 and the second body 102 are relatively moved between the first state and the second state. That is, the second guide portion 310 of the second member 300 may be drawn into the lower portion of the first guide portion 210 of the first member 200.

As described above, the first guide portion of the first member surrounds the upper surface and the lower surface of the first body. And, the second guide portion of the second member surrounds the upper surface and the lower surface of the second body. At the same time, the second guide portion of the second member is ready to be drawn into the lower portion of the first guide portion of the first member. Then, the second guide portion of the second member is drawn into or out from the lower portion of the first guide portion of the first member.

Accordingly, the first member and the second member are mounted on the side surfaces of the first body and the second body, which are movable relative to each other between the first state and the second state. At the same time, as the first body and the second body move relative to each other, the first member and the second member also move relative to each other. That is, as the case is mounted to the first body and the second body and moves corresponding to the movement of the first body and the second body moving away or closer to each other, it may provide high convenience. This is because the first guide portion of the first member and the second guide portion of the second member are formed to be drawn in or out from each other.

A second front surface glass 350 of the second member 300 may be disposed to extend from an upper second guide portion 310 to a lower second guide portion 310. And, the second front surface glass 350 of the second member 300 may be formed to contact a second front surface glass 350 of the first member 200 in the first state.

A sensor hole 313 corresponding to the sensor hole 213 formed at an upper portion of the first guide portion 210 of the first member 200 may be formed at an upper portion of the second guide portion 310 of the second member 300. In addition, a holding protrusion 311 to guide the second member 300 into the first member 200 may be formed on a front surface of the second guide portion 310 of the second member 300. Alternatively, a holding hole may be formed at the second guide portion 310 of the second member 300.

The flexible display device case C may include the front surface glass disposed to cover the front surface of the first member 200 and the front surface of the second member 300 so as to surround a display exposed to the front surface of the first body 101 and a front surface of the second body 102.

Specifically, referring to FIG. 4B, the front surface glass may include the first front surface glass 250 fixed by the first guide portion 210 and the first side surface portion 220 of the first member 200, and the second front surface glass 350 fixed by the second guide portion 310 and the second side surface portion 320 of the second member 300.

The front surface glass may be provided to protect a front display of the flexible display device 100. The first front surface glass 250 may be provided to protect a front display of the first body 101. The second front surface glass 350 may be provided to protect a front display of the second body 102.

When the flexible display device 100 is moved from the first state to the second state, the front surface glass may not cover the entire display exposed to the front surface of the flexible display device 100.

Specifically, as illustrated in (a) of FIG. 5, the first front surface glass 250 and the second front surface glass 350 may be contacted without a gap between each other when the case C is disposed in the first state.

In addition, as illustrated in (b) of FIG. 5, the first front surface glass 250 and the second front surface glass 350 may be spaced apart from each other when the flexible display device 100 is disposed in the second state. At this time, the display of the flexible display device 100 may be exposed to a gap between the first front surface glass 250 and the second front surface glass 350.

An area where the first member 200 and the second member 300 overlap with each other may change as the first body 101 and the second body 102 move relative to each other.

For example, as illustrated in (a) of FIG. 5, when the flexible display device 100 is in the first state, the area where the first member 200 and the second member 300 overlap with each other may be largest. At this time, the entire second guide portion 310 of the second member 300 may be drawn into the lower portion of the first guide portion 210 of the first member 200. Accordingly, the first member 200 and the second member 300 are arranged to have the largest overlapping area.

And, the overlapping area may be narrowed while the first body 101 and the second body 102 of the flexible display device 100 move from the first state to the second state.

For example, as illustrated in (b) of FIG. 5, the second guide portion 310 drawn into the first guide portion 210 when the flexible display device 100 was in the second state may be drawn out from the first guide portion 210. Accordingly, the area where the first member 200 and the second member 300 overlap each other may be narrowed.

Meanwhile, as described above, the first guide portion 210 of the first member 200 and the second guide portion 310 of the second member 300 may be configured to overlap each other in both the first state and the second state. However, the area where the first member 200 and the second member 300 overlap each other changes.

(c) of FIG. 5 is a view in which the first member 200 and the second member 300 are separated from each other. As will be described later, the first member 200 and the second member 300 may be provided with a shock reducing portion. And, a second slit 422 may be formed at the second guide portion 310 of the second member 300. This will be described later in detail.

A shock reducing portion 400 may be disposed at an end portion of the first guide portion 210 of the first member 200. And, the second guide portion 310 of the second member 300 may be a second plate 420.

The first member 200 may have a first slit 412 formed long in one direction. Specifically, referring to FIG. 10A, the first slit 412 may be formed at the first member 200.

Meanwhile, a first plate 410 of the shock reducing portion 400 may be at least a part of the first member 200 of the case C. Specifically, the first plate 410 may be a part of the first guide portion 210 of the first member 200.

In addition, the second plate 420 of the shock reducing portion 400 may be the second member 300 of the case C or at least a part of the second member 300. Specifically, the second plate 420 may be the second guide portion 310 of the second member 300. This will be described later in detail with reference to FIG. 8 and the following drawings.

FIG. 6 is a view illustrating (b) of FIG. 5 and a cut state thereof.

As described above, the first front surface glass 250 and the second front surface glass 350 may be configured such that adjacent side surfaces of the first front surface glass 250 and the second front surface glass 350 contact each other in the first state, and the adjacent side surfaces of the first front surface glass 250 and the second front surface glass 350 are spaced apart from each other as being moved from the first state to the second state.

(a) of FIG. 5 illustrates a state in which the first member 200 and the second member 300 are disposed in the second state.

Here, referring to (b) of FIG. 5, the first front surface glass 250 and the second front surface glass 350 are spaced apart from each other. And, the display of the flexible display device 100 may be exposed to a gap between the first front surface glass 250 and the second front surface glass 350.

FIG. 7 is a view illustrating a state in which the flexible display device case C according to an embodiment of the present disclosure is standing upright using the stand 280.

Referring to (a) of FIG. 7, the stand 280 is disposed on the rear surface portion 230 of the first member 200. The stand 280 may support the case and the flexible display device 100 enclosed by the case so that the case and the flexible display device 100 stand upright on a ground.

Referring to (b) of FIG. 7, the stand 280 may be pulled out from the rear surface portion 230. The stand 280 can be pulled out from the rear surface portion 230 by pushing or pulling one end of the stand 280 by hand.

(c) of FIG. 7 illustrates a state in which the stand 280 pulled out from the rear surface portion 230 is fixed to the ground when the flexible display device case C is in the first state. The stand 280 may be fixed by being supported by a predetermined pressure of the rear surface portion 230. Accordingly, the flexible display device case C and the flexible display device 100 can stand on the ground.

(d) of FIG. 7 illustrates a state in which the stand 280 pulled out from the rear surface portion 230 is fixed to the ground when the flexible display device case C is in the second state. As described above, as the stand 280 is supported and fixed by the predetermined pressure of the rear surface portion 230, the flexible display device case C and the flexible display device 100 in the second state can stand on the ground.

Meanwhile, an angle formed by the rear surface portion 230 and the stand 280 may be adjusted. Specifically, unlike (c) or (d) of FIG. 7, the rear surface portion 230 and the stand 280 can be fixed forming an angle between the flexible display device case C and the ground smaller than the angle in (c) or (d) of FIG. 7. In addition, the rear surface portion 230 and the stand 280 may be fixed at a plurality of angles.

FIG. 8 is an exploded perspective view of the shock reducing portion according to an embodiment of the present disclosure. FIG. 9 is a cross-sectional view illustrating the shock reducing portion of FIG. 8 viewed from different directions.

The flexible display device case C according to an embodiment of the present disclosure may further include the shock reducing portion 400. Specifically, the first member 200 and the second member 300 may further include the shock reducing portion 400.

The shock reducing portion 400 may include the first plate 410, the second plate 420, and an engaging member 430.

Here, as described above, the first plate 410 may be a part of the first member 200. Specifically, referring to FIG. 10A, the first plate 410 may be a part of the first guide portion 210 of the first member 200.

The second plate 420 may be a part of the second member 300. Specifically, referring to (c) of FIG. 5, the second plate 420 may be a part of the second guide portion 310 of the second member 300.

The first slit 412 is formed long in one direction at the first plate 410. A length of the first slit 412 may be slightly longer than a length of an engaging surface 434 of the engaging member 430, which will be described later. In addition, the first slit 412 may be formed long in a direction perpendicular to a direction in which the first plate 410 and the second plate 420 move closer to or farther from each other.

The second slit 422 may be formed long in a direction same as the direction in which the first slit 412 is formed long. And, the second plate 420 may overlap a part of the first plate 410.

The first plate 410 and the second plate 420 may be configured to achieve the first state and the second state. In the first state, the first plate 410 and the second plate 420 are moved closer to each other, and the second slit 422 is covered by the first plate 410. Specifically, referring to FIG. 10A, the first plate 410 and the second plate 420 are arranged in the first state. Here, the second slit 422 is covered by the first plate 410.

In the second state, the first slit 412 and the second slit 422 are arranged to communicate with each other. Specifically, referring to (a) of FIG. 11, the first plate 410 and the second plate 420 are separated from each other so that the first slit 412 and the second slit 422 can communicate with each other.

A thickness side of the second plate 420 may have a guide protrusion 424 protruding in at least one direction. The guide protrusion 424 may guide a movement of the second plate 420, so that the second plate 420 smoothly moves when the second plate 420 is drawn into a guide groove 444 of a cover 440.

Meanwhile, the second state in the present disclosure may refer to the followings. The state in which the first body 101 and the second body 102 of the flexible display device 100 are disposed away from each other. And, the state in which the first slit 412 of the first plate 410 and the second slit 422 of the second plate 420 of the shock reducing portion 400 are arranged to communicate with each other.

The engaging member 430 may include a main surface 432, the engaging surface 434 and a pin member hole portion 436.

The main surface 432 may be formed to be inclined with respect to the first plate 410 in the first state. Specifically, referring to (b) of FIG. 9, the main surface 432 is formed to be inclined with respect to the first plate 410. FIG. 9 illustrates the shock reducing portion 400 disposed in the first state. Meanwhile, a bottom surface of the main surface 432 may be supported by a protrusion 413 formed on the first plate 410. The protrusion 413 of the first plate 410 may reduce an impact at an end portion of the main surface 432 while the engaging member 430 rotating.

When the first plate 410 and the second plate 420 are not spaced apart in a gravitational direction, a moving object 450 may be disposed at one end side of the main surface 432 due to the inclination of the main surface 432 with respect to the first plate 410. In addition, when the first plate 410 and the second plate 420 are spaced apart vertically in the gravitational direction, the moving object 450 may move toward another end side of the main surface 432 along the main surface by gravity.

The engaging surface 434 may be bent at the end portion of the main surface 432 and extend in a direction toward the first plate 410. Referring to (b) of FIG. 9, the engaging surface 434 is bent at the end portion of the main surface 432 and extends therefrom. In addition, the engaging surface 434 may be maintained in a state inserted into the first slit 412 of the first plate 410 in the first state.

As the engaging surface 434 is formed in a direction perpendicular to the direction in which the first plate 410 and the second plate 420 move relative to each other, the shock reducing portion can withstand greater impact transmitted from outside when the engaging surface 434 of the engaging member 430 is inserted into the first slit 412 and the second slit 422.

In addition, the engaging member 430 may further include a pin member 438. The pin member 438 may provide an axis of rotation of the engaging member 430. The pin member 438 may be fitted into the pin member hole portion 436 and be fixed to the cover 440 described below.

The pin member hole portion 436 may be formed at the bottom surface of the main surface 432. In addition, the pin member 438 may be inserted into a pin member hole 436h formed in the pin member hole portion 436. The pin member hole portion 436 may be formed close to a centroid of the engaging member 430. Accordingly, the engaging member 430 can easily rotate when the moving object 450 to be described later moves beyond the pin member hole portion 436.

The engaging surface 434 is rotatable centering on the pin member hole portion 436 into which the pin member 438 is inserted. When the first slit 412 and the second slit 422 are disposed in the second state in which the first slit 412 and the second slit 422 communicate with each other, the engaging surface 434 may be inserted into the first slit 412 and the second slit 422 as the engaging member 430 rotates.

The engaging surface 434 is inserted into the first slit 412 and the second slit 422 in the second state to prevent the first plate 410 and the second plate 420 from being moved away or closer to each other by an external force. Accordingly, since the first plate 410 and the second plate 420 are not moved away or closer to each other even if an external force is applied to the shock reducing portion 400, the shock reducing portion 400 can absorb the external force. Accordingly, an impact transmitted to the flexible display device 100 which is connected to the shock reducing portion 400 can be reduced.

The engaging member 430 may be configured to be rotated as the first plate 410 and the second plate 420 are disposed in the second state and arranged side by side in the gravitational direction. Referring to (a) of FIG. 12, the state in which the first plate 410 and the second plate 420 are arranged side by side in the gravitational direction, may refer to a state in which the first plate 410 and the second plate 420 are sequentially arranged in the gravitational direction G.

Such an arrangement state may be achieved when the flexible display device 100 is falling toward the ground. In this case, a big impact is applied to the second body 102 of the flexible display device 100, so that configurations changing the first body 101 and the second body 102 between the first state and the second state may be damaged. Therefore, as the engaging member 430 of the present disclosure is rotated when the first plate 410 and the second plate 420 are arranged side by side in the gravitational direction while being disposed in the second state, the impact applied to the second body 102 of the flexible display device 100 can be reduced.

Specifically, referring to (b) to (d) of FIG. 12, as the first plate 410 and the second plate 420 are disposed in the second state while being disposed side by side in the gravitational direction, the engaging member 430 can be rotated by the moving object 450 moving on the main surface 432 of the engaging member 430. This will be described later in detail.

The shock reducing portion 400 may further include the moving object 450 configured to be moved on the main surface 432 to induce rotation of the engaging member 430 by pressing the engaging member 430. The moving object 450 may be disposed on the main surface 432 and may be moved on the main surface 432 by gravity.

Specifically, the moving object 450 may be moved on the main surface 432 as the first plate 410 and the second plate 420 are spaced apart in the gravitational direction, and may press the main surface 432 when moved beyond the pin member 438 to rotate the engaging member 430 centering on the pin member 438.

The moving object 450 may be defined in a ball shape. Specifically, as illustrated in FIG. 8, the moving object 450 may be defined in a ball shape. Accordingly, the moving object 450 can move freely on the main surface 432.

Meanwhile, the shock reducing portion 400 may further include the cover 440.

The cover 440 may be configured to cover the first plate 410. Specifically, the cover 440 may be formed integrally with the first plate 410 to cover the first plate 410. The first plate 410 and the cover 440 may also be formed separately, not integrally. As the cover 440 covers the first plate 410, the moving object 450 moving on the engaging member 430 does not fall out of the shock reducing portion 400.

The guide groove 444 may guide the movement of the second plate 420. Specifically, the second plate 420 may be fitted into the guide groove 444 of the cover 440 to change a relative distance from the first plate 410.

In addition, the cover 440 may further include a rear cover 460 covering a rear side of the cover 440. The rear cover 460 may cover the rear side of the cover 440 so that the moving object 450 moving on the engaging member 430 does not fall out through the rear side of the cover 440. In addition, when the moving object 450 and the engaging member 430 are damaged, it can be checked or repaired by removing the rear cover 460. On an inner side of the rear cover 460, a bumper 462 may be further provided at an area where the moving object 450 might contact, so that the moving object 450 is not damaged due to the contact.

In addition, fixing holes 446 into which both ends of the pin member 438 are fixed may be formed at the cover 440. The pin member 438 is fitted into the fixing holes 446 to provide an axis of rotation of the engaging member 430.

In addition, the cover 440 may include fixing surfaces 440a and a cover surface 443.

When the first plate 410 and the cover 440 are formed integrally, the first plate 410 may be integrally formed with the fixing surfaces 440a. The fixing surfaces 440a may guide the moving object 450 when the moving object 450 is moving on the engaging member 430. In addition, the fixing surfaces 440a may prevent the moving object 450 from moving out of the cover 440.

The cover surface 443 may connect the fixing surfaces 440a disposed on both sides. In addition, a path groove 440g formed to be bent along a path in which the moving object 450 moves may be formed inside the cover surface 443.

The path groove 440g may be formed to have a narrower width as it goes from one side of a first zone 440g1 toward a boundary of the first zone 440g1 and a second zone 440g2 to guide a path in which the moving object 450 is moved on the main surface 432. Specifically, referring to FIG. 9, a gap between inner surfaces of the fixing surfaces 440a may be narrowed from the rear cover 460 side toward the engaging surface 434. Accordingly, the main surface 432 may also be formed to have a narrower width from the rear cover 460 side toward the engaging surface 434 of the engaging member 430.

The fixing surfaces 440a and the main surface 432 may have some space apart from each other. This is to prevent the engaging member 430 from being locked by the fixing surfaces 440a of the cover 440 while the engaging member 430 is rotating.

Meanwhile, unlike the above-described embodiment, a width of the path groove 440g may be narrowed drastically. As the width of the path groove 440g is narrowed, a range of the moving object 450 moving right and left may get smaller. In addition, as the width of the path groove 440g is narrowed, the moving object 450 may press a center of the main surface 432. Accordingly, the engaging member 430 may rotate more easily.

Meanwhile, the path groove 440g may include the first zone 440g1 to a third zone 440g3.

The first zone 440g1 may be formed in which the main surface 432 of the engaging member 430 corresponds to an inclination formed with respect to the second plate 420. Specifically, as illustrated in (b) of FIG. 9, a range of the first zone 440g1 may be from the rear cover 460 side to a middle part of the main surface 432. In the first zone 440g1, a thickness of the cover surface 443 may be reduced in response to the inclination of the main surface 432. Accordingly, a space through which the moving object 450 can move may be provided inside the path groove 440g.

The moving object 450 may be guided along a surface in the second zone 440g2 after passing through the first zone 440g1 to press the engaging member 430 to rotate the engaging member 430.

The second zone 440g2 may be bent at a boundary of the first zone 440g1 and the second zone 440g2 and declined to be closer to the first plate 410. As illustrated in (b) of FIG. 9, the thickness of the cover surface 443 may be thickened immediately after passing through the first zone 440g1. Accordingly, the moving object 450 may contact the cover surface 443 in the second zone 440g2.

Here, when the first plate 410 and the second plate 420 are disposed in the second state, the moving object 450 may press the engaging member 430 to rotate the engaging member 430. Specifically, as illustrated in (c) of FIG. 12, the first plate 410 and the second plate 420 are disposed in the second state, and the moving object 450 may be moved while pressing the engaging member 430 in the second zone 440g2. Accordingly, the engaging member 430 is rotated centering on the pin member 438. In addition, a space between the cover surface 443 of the cover 440 and the main surface 432 of the engaging member 430 is secured, so that the moving object 450 can be additionally moved.

In the third zone 440g3, the cover surface 443 may protrude more toward the first plate 410 than the second zone 440g2. Accordingly, when the moving object 450 presses the engaging member 430 in the second zone 440g2, the movement of the moving object 450 may be controlled so that the moving object 450 no longer moves. In the third zone 440g3, the moving object 450 is caught by the cover 440 so that even when an impact from outside is transmitted through the second plate 420, the moving object 450 is not moving back toward the main surface 432.

FIGS. 10A and 10B are cross-sectional views illustrating the shock reducing portion mounted on the case viewed from different directions. FIG. 11 is a conceptual view illustrating a state in which the moving object is moving inside the shock reducing portion while the case is falling. FIG. 12 is a conceptual view illustrating a state in which the moving object in the shock reducing portion is moved to rotate the engaging member while the first member and the second member of the case are arranged side by side in the gravitational direction.

FIG. 10A is a cross-sectional view of the flexible display device case C and the shock reducing portion cut in one direction. Referring to the drawing, the moving object 450 is disposed at one end of the main surface 432 of the engaging member 430 due to the inclination of the main surface 432. The rear cover 460 may support the moving object 450 so that the moving object 450 does not escape through a rear side of the shock reducing portion 400.

The path groove 440g forming a space with the main surface 432 of the engaging member 430 through which the moving object 450 can move may be formed inside the cover 440. A height of the path groove 440g may be formed just enough for the moving object 450 to pass therethrough. Accordingly, when the moving object 450 is moved on the main surface 432, an impact generated while colliding between the cover 440 and the main surface 432 can be reduced.

As described above, the engaging member 430 may be configured to be rotated when the first plate 410 and the second plate 420 are disposed in the second state, and are arranged side by side in the gravitational direction.

Specifically, as illustrated in (a) to (d) of FIG. 11, it may be assumed that the first member 200 and the second member 300 of the case C are arranged side by side in the gravitational direction while falling down.

Referring to (a) of FIG. 11, the first plate 410 and the second plate 420 (the first member 200 and the second member 300) are disposed in the second state. Accordingly, the first slit 412 and the second slit 422 may be disposed in communication with each other. However, since the first plate 410 and the second plate 420 are not disposed side by side in the gravitational direction but are disposed at a same level with respect to the ground, the moving object 450 does not move. And, as the moving object 450 is disposed at the rear portion of the main surface 432 of the engaging member 430, the engaging member 430 does not rotate.

Referring to (b) of FIG. 11, as the case C is slightly declined to the ground, the first plate 410 and the second plate 420 may also be slightly declined. Accordingly, the moving object 450 may be moved along the main surface 432. However, the moving object 450 is not moved to a position beyond the pin member 438 of the engaging member 430. Accordingly, the locking member 430 does not rotate, but relative positions of the first plate 410 and the second plate 420 may be changed while not being fixed to each other.

Referring to (c) and (d) of FIG. 11, as the first plate 410 and the second plate 420 are further declined to the ground, the moving object 450 may be further moved toward a top end of the main surface 432. However, the moving object 450 does not move to a section beyond the pin member 438 of the main surface 432. Accordingly, the engaging member 430 does not rotate.

Subsequently, as illustrated in (a) of FIG. 12, it may be assumed that the first member 200 and the second member 300 of the flexible display device case C fall down while being arranged side by side in the gravitational direction.

Here, the moving object 450 is moved on the main surface 432 as the first plate 410 and the second plate 420 are spaced apart in the gravitational direction, and when the moving object 450 is moved beyond the pin member 438, it may press the main surface 432 so that the engaging member 430 rotates about the pin member 438.

Specifically, as illustrated in (b) of FIG. 12, when the first plate 410 and the second plate 420 are arranged side by side in the gravitational direction, the moving object 450 moves along the main surface 432 of the engaging member 430. Then, when the moving object 450 is disposed close to the pin member 438, the moving object 450 may contact the cover 440.

Next, as illustrated in (c) of FIG. 12, the moving object 450 is moved beyond the pin member 438 of the engaging member 430. At this time, the first plate 410 and the second plate 420 are disposed in the second state, and the first slit 412 and the second slit 422 communicate with each other. The moving object 450 may contact the cover 440 while moving beyond the pin member 438. In contact with the cover 440, the moving object 450 may press the engaging member 430.

As illustrated in (d) of FIG. 12, when the moving object 450 is completely moved downward, the engaging member 430 is inserted into the first slit 412 and the second slit 422. Specifically, the engaging surface 434 of the engaging member 430 may be inserted into the first slit 412 and the second slit 422. Accordingly, the first plate 410 and the second plate 420 may be fixed to each other.

The aforementioned flexible display device case is not limited to the configurations and the methods of the embodiments described above, but all or some of the embodiments may be selectively combined so that various modifications can be made.

The invention claimed is:

1. A flexible display device case that is mountable to a flexible display device including a first body and a second body configured to be movable relative to the first body, the flexible display device case comprising:
a first member mountable to the first body to surround a side surface portion of the first body, the first member comprising a first guide portion, wherein the first guide portion surrounds an upper side and a lower side of the first body, and a first slit formed along a first direction perpendicular to a direction in which the first body and the second body move relative to each other; and
a second member mountable to the second body to surround a side surface portion of the second body, the second member comprising a second guide portion, wherein the second guide surrounds an upper side and a lower side of the second body, and a second slit formed along the first direction,
wherein an area overlapped by the first member and the second member changes as the first body and the second body move relative to each other,
wherein the flexible display device further includes a flexible display,
wherein the first member and the second member further comprise an engaging member configured to be rotatable in one direction, and having an engaging surface,
wherein the engaging surface of the engaging member is inserted into the first slit when the flexible display device is such that the first body and the second body are moved closer to each other, wherein the engaging surface of the engaging member is inserted into the first slit and the second slit when the flexible display device is such that the first body and the second body are moved away from each other such that an area of the flexible display that is exposed to a front surface of the first body is largest, so as to prevent the first plate and the second plate from being moved away from or closer to each other by an external force, wherein the first member and the second member are configured such that:

the area overlapped by the first member and the second member is largest when the flexible display device is in a first state, in which the first body and the second body are located adjacent to each other such that an area of the flexible display that is exposed to a rear surface of the second body is largest; and the area overlapped by the first member and the second member is narrowed while the flexible display device is changed from the first state to a second state, in which the first body and the second body are moved away from each other such that an area of the flexible display that is exposed to the front surface of the first body is largest, wherein the first member and the second member further comprise a shock reducing portion, wherein the shock reducing portion comprises:

a first plate formed to the first member; and a second plate including a portion that overlaps the first plate formed to the second member, and wherein the first plate and the second plate are configured to be capable of being:

disposed adjacent to each other when the flexible display device is in the first state so that the second slit is covered by the first plate; and moved away from each other when the flexible display device is in the second state so that the first slit and the second slit communicate with each other.

2. The flexible display device case of claim 1, wherein the engaging member is further configured to be rotated as the first plate and the second plate are moved away from each other when the flexible display device is in the second state and arranged side by side in a gravitational direction.

3. The flexible display device case of claim 1, wherein the engaging member has a main surface that is inclined with respect to the first plate when the flexible display device is in the first state, and wherein the engaging surface is bent at an end portion of the main surface and extends in a direction toward the first plate.

4. The flexible display device case of claim 3, wherein the engaging member comprises:

a movable object configured to be moved on the main surface of the engaging member to induce rotation of the engaging member by pressing the engaging member.

5. The flexible display device case of claim 4, wherein the movable object is configured to:

be moved on the main surface as the first plate and the second plate are spaced apart in a gravitational direction; and press the main surface to rotate the engaging member when the movable object is moved beyond a predetermined position on the main surface.

6. The flexible display device case of claim 1, wherein the shock reducing portion further comprises:

a cover configured to cover the first plate, wherein the cover is provided with a guide groove to guide a movement of the second plate.

7. The flexible display device case of claim 6, wherein the cover has:

fixing surfaces into which the first plate is fitted to be fixed; and a cover surface to connect the fixing surfaces disposed on both sides, wherein an inner side of the cover surface has a path groove bent along a path of a movement of the movable object.

8. The flexible display device case of claim 7, wherein the path groove has:

a first zone formed such that a main surface of the engaging member corresponds to an inclination formed with respect to the second plate; and a second zone bent at a boundary of the first zone and the second zone, and angled to be closer to the first plate, wherein the movable object is movable to pass through the first zone and be guided along a surface in the second zone, and then press the engaging member so that the engaging member rotates.

* * * * *